United States Patent
Stanke

(10) Patent No.: US 12,506,351 B2
(45) Date of Patent: Dec. 23, 2025

(54) POWER SUPPLY REGULATOR FOR A POWER TOOL BATTERY PACK

(71) Applicant: MILWAUKEE ELECTRIC TOOL CORPORATION, Brookfield, WI (US)

(72) Inventor: Zachary G. Stanke, Wausau, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 743 days.

(21) Appl. No.: 17/887,074

(22) Filed: Aug. 12, 2022

(65) Prior Publication Data
US 2023/0050963 A1    Feb. 16, 2023

Related U.S. Application Data

(60) Provisional application No. 63/232,347, filed on Aug. 12, 2021.

(51) Int. Cl.
*H01M 10/44* (2006.01)
*H01M 10/42* (2006.01)
(Continued)

(52) U.S. Cl.
CPC ....... *H02J 7/00714* (2020.01); *H01M 10/425* (2013.01); *H01M 10/482* (2013.01);
(Continued)

(58) Field of Classification Search
CPC ............ H01M 50/204; H01M 10/425; H01M 120/482; H02J 7/0029; H02J 7/00714; H02J 7/0047; H02J 7/0063; H02J 7/00712
(Continued)

(56) References Cited

U.S. PATENT DOCUMENTS

| 4,835,410 A | 5/1989 | Bhagwat et al. |
| 5,929,597 A | 7/1999 | Pfeifer et al. |

(Continued)

FOREIGN PATENT DOCUMENTS

| CN | 204145059 U | 2/2015 |
| CN | 204304482 U | 4/2015 |

(Continued)

OTHER PUBLICATIONS

International Search Report and Written Opinion for Application No. PCT/US2022/040209 dated Dec. 8, 2022 (9 pages).

(Continued)

*Primary Examiner* — Edward Tso
(74) *Attorney, Agent, or Firm* — Michael Best & Friedrich LLP

(57) ABSTRACT

A power regulation unit is provided for regulating power to or from a power tool battery pack. The power regulation unit includes power regulation circuitry and a controller. The power regulation circuitry is configured to regulate a received power. The controller is connected to the power regulation circuitry. The controller is configured to receive input power from one or more battery cells, regulate the input power by performing at least one of a voltage regulation and a current regulation, and output a regulated output power. For voltage regulation, the regulated output power includes a constant voltage regardless of an operating current of the power tool. For current regulation, the regulated output power includes a constant voltage up to a predetermined current threshold.

20 Claims, 22 Drawing Sheets

(51) Int. Cl.
*H01M 10/46* (2006.01)
*H01M 10/48* (2006.01)
*H01M 50/204* (2021.01)
*H01M 50/247* (2021.01)
*H02J 7/00* (2006.01)

(52) U.S. Cl.
CPC ....... *H01M 50/204* (2021.01); *H01M 50/247* (2021.01); *H02J 7/0029* (2013.01); *H02J 7/0047* (2013.01); *H01M 2220/30* (2013.01)

(58) Field of Classification Search
USPC ....... 320/107, 116, 127, 134, 135, 136, 138, 320/142, 152, 162
See application file for complete search history.

(56) References Cited

U.S. PATENT DOCUMENTS

| | | | |
|---|---|---|---|
| 6,087,815 A | 7/2000 | Pfeifer et al. | |
| 6,198,250 B1 | 3/2001 | Gartstein et al. | |
| 6,566,843 B2 | 5/2003 | Takano et al. | |
| 6,628,106 B1 * | 9/2003 | Batarseh | H02M 3/1584 323/284 |
| 6,683,396 B2 | 1/2004 | Ishida et al. | |
| 7,225,959 B2 | 6/2007 | Patton et al. | |
| 7,270,910 B2 | 9/2007 | Yahnker et al. | |
| 7,494,035 B2 | 2/2009 | Weaver et al. | |
| 7,508,171 B2 | 3/2009 | Carrier et al. | |
| 7,602,146 B2 | 10/2009 | Carrier et al. | |
| 7,719,234 B2 | 5/2010 | Carrier et al. | |
| 7,825,615 B2 | 11/2010 | Chen et al. | |
| 8,115,461 B2 | 2/2012 | Yoshio | |
| 8,237,404 B2 | 8/2012 | Takano et al. | |
| 8,390,249 B2 | 3/2013 | Walley et al. | |
| 8,410,637 B2 | 4/2013 | Karaoguz et al. | |
| 8,436,491 B2 | 5/2013 | Walley et al. | |
| 8,525,370 B2 | 9/2013 | Walley et al. | |
| 8,618,697 B2 | 12/2013 | Karaoguz et al. | |
| 8,716,977 B2 | 5/2014 | Walley et al. | |
| 8,733,470 B2 | 5/2014 | Matthias et al. | |
| 8,813,866 B2 | 8/2014 | Suzuki | |
| 8,952,655 B2 | 2/2015 | Walley et al. | |
| 8,984,711 B2 | 3/2015 | Ota et al. | |
| 9,065,155 B2 | 6/2015 | Takano et al. | |
| 9,094,054 B2 | 7/2015 | Walley et al. | |
| 9,159,981 B2 | 10/2015 | Chan et al. | |
| 9,224,994 B2 | 12/2015 | Ota et al. | |
| 9,314,900 B2 | 4/2016 | Vanko et al. | |
| 9,362,986 B2 | 6/2016 | Karaoguz et al. | |
| 9,401,623 B2 | 7/2016 | Walley et al. | |
| 9,406,915 B2 | 8/2016 | White et al. | |
| 9,472,969 B2 | 10/2016 | Kaizo et al. | |
| 9,496,531 B2 | 11/2016 | Hachisuka et al. | |
| 9,559,539 B2 | 1/2017 | Goto et al. | |
| 9,579,776 B2 | 2/2017 | Arimura et al. | |
| 9,583,745 B2 | 2/2017 | White et al. | |
| 9,583,746 B2 | 2/2017 | Ota et al. | |
| 9,583,793 B2 | 2/2017 | White et al. | |
| 9,590,444 B2 | 3/2017 | Walley et al. | |
| 9,746,860 B2 | 8/2017 | Sakaue et al. | |
| 9,762,153 B2 | 9/2017 | Forster et al. | |
| 9,806,767 B2 | 10/2017 | Walley et al. | |
| 9,871,484 B2 | 1/2018 | White et al. | |
| 9,893,384 B2 | 2/2018 | Velderman et al. | |
| 10,050,572 B2 | 8/2018 | Pant et al. | |
| 10,056,582 B2 | 8/2018 | White et al. | |
| 10,103,412 B2 | 10/2018 | Li | |
| 10,177,701 B2 | 1/2019 | White et al. | |
| 10,193,111 B2 | 1/2019 | Varipatis et al. | |
| 10,199,844 B2 | 2/2019 | Horie et al. | |
| 10,206,431 B2 | 2/2019 | Sur et al. | |
| 10,233,890 B2 | 3/2019 | Ma et al. | |
| 10,236,819 B2 | 3/2019 | White et al. | |
| 10,243,491 B2 | 3/2019 | Cox et al. | |
| 10,250,178 B2 | 4/2019 | White et al. | |
| 10,279,461 B2 | 5/2019 | Miaowu et al. | |
| 10,291,173 B2 | 5/2019 | Cox et al. | |
| 10,333,453 B2 | 6/2019 | Forster et al. | |
| 10,333,454 B2 | 6/2019 | Forster et al. | |
| 10,361,651 B2 | 7/2019 | White et al. | |
| 10,403,867 B2 | 9/2019 | Hachisuka et al. | |
| 10,411,558 B2 | 9/2019 | Forster et al. | |
| 10,439,415 B2 | 10/2019 | Zhu et al. | |
| 10,469,006 B2 | 11/2019 | Pant et al. | |
| 10,498,151 B2 | 12/2019 | Karlsson et al. | |
| 10,541,639 B2 | 1/2020 | White et al. | |
| 10,559,789 B2 | 2/2020 | Ota et al. | |
| 10,587,138 B2 | 3/2020 | Goto et al. | |
| 10,608,574 B2 | 3/2020 | White et al. | |
| 10,615,733 B2 | 4/2020 | Cox et al. | |
| 10,658,903 B2 | 5/2020 | Forster et al. | |
| 10,840,559 B2 | 11/2020 | Velderman et al. | |
| 10,923,933 B2 | 2/2021 | Zhu et al. | |
| 10,965,229 B2 | 3/2021 | Pant | |
| 10,972,041 B2 | 4/2021 | White et al. | |
| 10,978,746 B2 | 4/2021 | Velderman et al. | |
| 10,985,619 B2 | 4/2021 | Walley et al. | |
| 11,005,399 B2 | 5/2021 | Pant | |
| 11,005,411 B2 | 5/2021 | White et al. | |
| 11,005,412 B2 | 5/2021 | White et al. | |
| 11,063,456 B2 | 7/2021 | Zhu et al. | |
| 11,063,548 B2 | 7/2021 | Cox et al. | |
| 11,070,162 B2 | 7/2021 | Cox et al. | |
| 11,133,772 B2 | 9/2021 | White et al. | |
| 11,152,886 B2 | 10/2021 | White et al. | |
| 11,171,542 B2 | 11/2021 | Vanko et al. | |
| 11,211,664 B2 | 12/2021 | Barton et al. | |
| 11,211,868 B2 | 12/2021 | Yoshinari et al. | |
| 11,251,508 B2 | 2/2022 | Brozek et al. | |
| 11,296,528 B2 | 4/2022 | Zhu et al. | |
| 11,329,597 B2 | 5/2022 | Vanko et al. | |
| 2005/0073282 A1 | 4/2005 | Carrier et al. | |
| 2005/0194935 A1 | 9/2005 | Kubota et al. | |
| 2005/0248309 A1 | 11/2005 | Denning | |
| 2008/0003491 A1 | 1/2008 | Yahnker et al. | |
| 2009/0146614 A1 | 6/2009 | Carrier et al. | |
| 2011/0127953 A1 | 6/2011 | Walley et al. | |
| 2012/0287691 A1 | 11/2012 | Breuner | |
| 2013/0164589 A1 | 6/2013 | Ota et al. | |
| 2014/0042970 A1 | 2/2014 | Grigoryants | |
| 2014/0117922 A1 | 5/2014 | Pham | |
| 2015/0222212 A1 | 8/2015 | Iwata | |
| 2016/0111984 A1 | 4/2016 | Koizumi et al. | |
| 2017/0104340 A1 | 4/2017 | Soleño et al. | |
| 2017/0126051 A1 | 5/2017 | Cox et al. | |
| 2017/0338753 A1 | 11/2017 | Forster et al. | |
| 2018/0090979 A1 | 3/2018 | Forster et al. | |
| 2018/0337545 A1 | 11/2018 | Crosby et al. | |
| 2019/0341872 A1 | 11/2019 | Cox et al. | |
| 2020/0036050 A1 | 1/2020 | Shimura et al. | |
| 2020/0127251 A1 | 4/2020 | Ota et al. | |
| 2020/0228046 A1 | 7/2020 | White et al. | |
| 2020/0335834 A1 | 10/2020 | Velderman et al. | |
| 2020/0412294 A1 | 12/2020 | Cox | |
| 2021/0184410 A1 | 6/2021 | Huang et al. | |
| 2021/0234412 A1 | 7/2021 | Walley et al. | |
| 2022/0060085 A1 | 2/2022 | Vanko et al. | |
| 2022/0209706 A1 | 6/2022 | Cox et al. | |

FOREIGN PATENT DOCUMENTS

| | | |
|---|---|---|
| CN | 204541109 U | 8/2015 |
| CN | 206211869 U | 5/2017 |
| CN | 206373858 U | 8/2017 |
| CN | 108767921 A | 11/2018 |
| CN | 111022440 A | 4/2020 |
| CN | 213937473 U | 8/2021 |
| DE | 102012218023 A1 | 4/2014 |
| DE | 102017100513 A1 | 7/2018 |
| EP | 2713474 A2 | 4/2014 |
| EP | 3517253 A1 | 7/2019 |
| EP | 2709235 B1 | 4/2020 |
| JP | 2007004591 A | 1/2007 |
| JP | 2021024044 A | 2/2021 |

(56) References Cited

FOREIGN PATENT DOCUMENTS

| | | |
|---|---|---|
| WO | 2011118471 A1 | 9/2011 |
| WO | 2018098628 A1 | 6/2018 |
| WO | 2019201300 A1 | 10/2019 |
| WO | 2021104722 A1 | 6/2021 |

OTHER PUBLICATIONS

Extended European Search Report for Application No. 22856673.3 dated May 15, 2025 (7 pages).

* cited by examiner

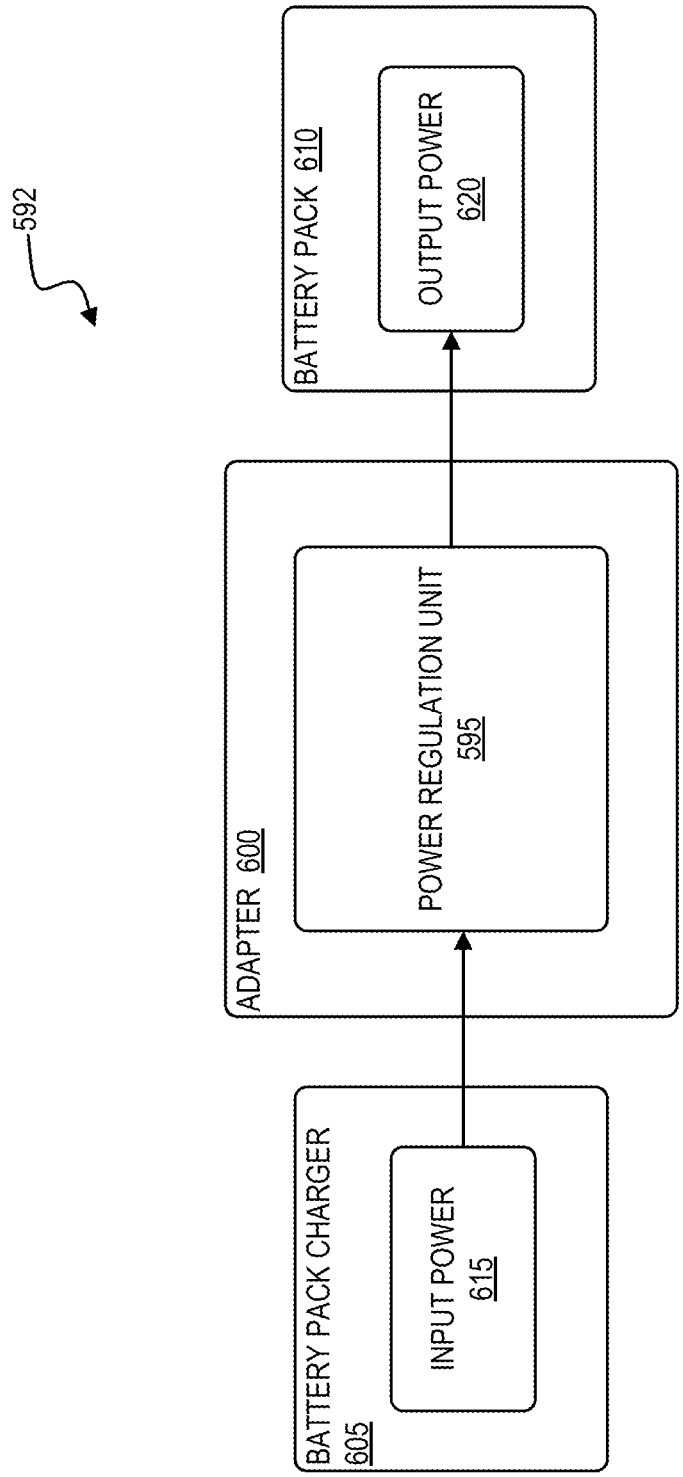

POWER SUPPLY REGULATOR FOR A POWER TOOL BATTERY PACK

RELATED APPLICATIONS

This application claims the benefit of U.S. Provisional Patent Application No. 63/232,347, filed Aug. 12, 2021, the entire content of which is hereby incorporated by reference.

FIELD

Embodiments described herein relate to power tools.

SUMMARY

Power tools require input power in order to perform their functions. Often, the input power is received from a power source, such as a battery pack. The battery pack provides a voltage and current to the power tool. Traditionally, the voltage and current provided to the power tool depend on the voltage rating of the battery pack. For example, an 18 volt battery pack provides approximately 18 volts to the power tool. The voltage provided by the battery pack may vary based on the output current provided. For example, the power tool may experience a larger load, thus increasing the amount of current drawn from the battery pack and decreasing the output voltage as the current decreases. Additionally, in some cases, it may be necessary for a battery pack to provide a voltage to a power tool that is rated for a different amount of voltage than the battery pack.

Thus, there is a need for a power supply regulator that regulates input power to a power tool from a battery pack. It would be advantageous to regulate the power input into a power tool so that the power tool may be optimally operated regardless of the battery pack or the output power requirements. Additionally, it would be advantageous to regulate power output from a battery pack charger to a battery pack so the battery pack may be charged at a rated voltage, regardless of the voltage rating of the battery pack charger.

Embodiments described herein provide systems and methods for regulating power to or from a power tool battery pack.

Power regulation units described herein include power regulation circuitry and a controller. The power regulation circuitry is configured to regulate a received power. The controller is connected to the power regulation circuitry. The controller is configured to receive input power from one or more battery cells, regulate the input power by performing at least one of a voltage regulation and a current regulation, and output a regulated output power. For voltage regulation, the regulated output power includes a constant voltage regardless of an operating current of the power tool. For current regulation, the regulated output power includes a constant voltage up to a predetermined current threshold.

Methods described herein provide for operating a power regulation unit to regulate power to or from a power tool battery pack. The methods include receiving input power from one or more battery cells, regulating the input power by performing at least one of a voltage regulation and a current regulation, and outputting a regulated output power. For the voltage regulation, the regulated output power includes a constant voltage regardless of an operating current of the power tool. For the current regulation, the regulated output power includes a constant voltage up to a predetermined current threshold.

Battery pack systems described herein include a battery pack and a power regulation unit. The battery pack includes one or more battery cells and an interface for mechanically and electrically connecting to a device. The power regulation unit includes power regulation circuitry configured to regulate a received power and a controller connected to the power regulation circuitry. The controller is configured to regulate the received power by performing at least one of a voltage regulation and a current regulation, and output a regulated output power. For the voltage regulation, the regulated output power includes a constant voltage. For the current regulation, the regulated output power includes a constant voltage until a current reaches a predetermined current threshold.

Before any embodiments are explained in detail, it is to be understood that the embodiments are not limited in their application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Other aspects of the embodiments will become apparent by consideration of the detailed description and accompanying drawings.

BRIEF DESCRIPTION OF THE DRAWINGS

FIG. 6D is a block diagram of the power regulation unit of the adapter of FIG. 3 in accordance with embodiments described herein.

DETAILED DESCRIPTION

Embodiments described herein provide systems and methods for regulating power to a power tool or from a battery pack. For example, a power regulation unit regulates power to a power tool by fixing the voltage output to the power tool, limiting the current output to the power tool, forcing shutoff when the battery pack is overloaded, negotiating the desired voltage from the battery pack, automatically calibrating a load line to the power tool, negotiating the load line calibration to the power tool, and/or supporting non-standard cell chemistry and/or non-standard cell configuration.

By regulating the power output to the power tool or battery pack, several advantages are achieved. For example, the power tool may be operated at various voltages and currents in order to optimize power used by the power tool. Additionally, the power tool may be used with non-standard cell chemistries and non-standard cell configurations, which offers users more flexibility when operating the power tool.

The above-highlighted techniques and advantages for regulating power to a power tool or from battery pack can be implemented for any power tool or battery pack where such power regulation techniques would be beneficial. similar power regulation techniques can be applied to battery pack chargers for charging battery packs.

Figure 1:
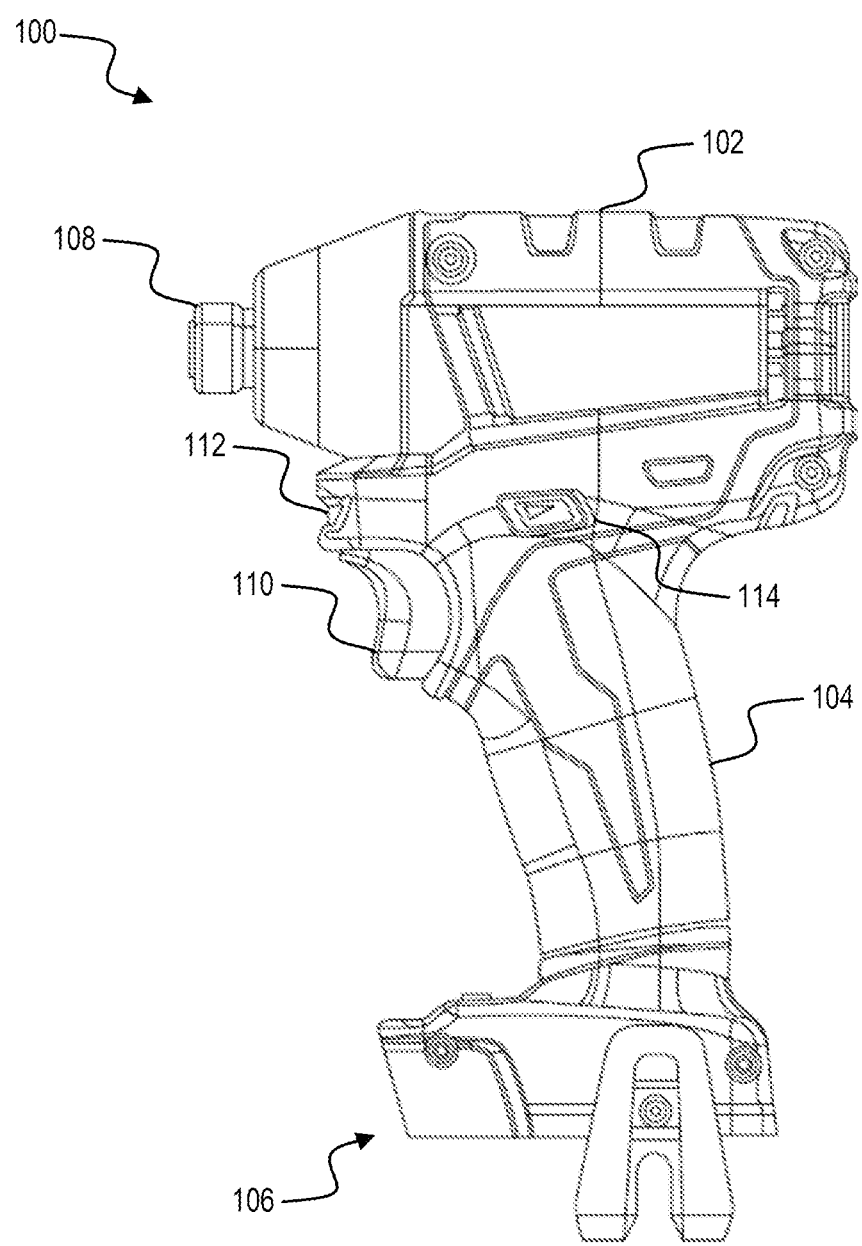
FIG. 1 illustrates a power tool in accordance with embodiments described herein.

FIG. 1 illustrates an embodiment of a power tool 100 to be used with a power regulation unit to regulate power input to the power tool 100. The power tool 100 is configured to perform one or more specific tasks (e.g., drilling, fastening, pressing, impacting, etc.). For example, an impact wrench is associated with the task of generating a rotational output (e.g., to drive a fastener). The task(s) associated with a particular tool may also be referred to as the primary function(s) of the tool. The particular power tool devices 100 illustrated and described herein (e.g., an impact driver) are merely representative. Other embodiments may include a variety of power tools. Power tools can include drills, circular saws, jig saws, band saws, reciprocating saws, screw drivers, angle grinders, straight grinders, hammers, multi-tools, impact wrenches, rotary hammers, impact drivers, angle drills, powered ratchets, powered torque wrenches, hydraulic pulse tools, hydraulic tensioning tools, lock bolt installation tools, reaction arm tools, riveting tools, nailers, staplers, TC bolt guns, and the like.

The power tool 100 illustrated in FIG. 1 is an impact driver. The power tool 100 includes an upper main body 102, a handle 104, a battery pack/adapter receiving portion 106, an output drive device or mechanism 108, a trigger 110, a work light 112, and forward/reverse selector 114. The power tool 100 further includes a motor within the main body 102 of the housing and having a rotor and a stator. The rotor is coupled to a motor shaft arranged to produce an output outside of the housing via the output drive device or mechanism. The housing of the power tool 100 (e.g., the main body and the handle) are composed of, for example, a durable and light-weight plastic material. The drive device 108 is composed of, for example, a metal (e.g., steel) output spindle. The battery pack receiving portion 106 is configured to receive and couple to the battery pack 120 (see FIG. 2) that provides power to the power tool 100. The battery pack receiving portion 106 includes a connecting structure to engage a mechanism that secures the battery pack and a terminal block to electrically connect the battery pack 120 to the power tool 100.

In some embodiments, the power tool 100 further includes a power regulation unit 270 (see FIG. 5) for regulating the power input from the battery pack 120 to the power tool 100. In some embodiments, the battery pack receiving portion 106 is configured to receive and couple to an adapter 150 (see FIG. 3) that includes the power regulation unit 270 (see FIG. 4) to regulate the power provided to the power tool 100 from the battery pack 120.

Figure 2:
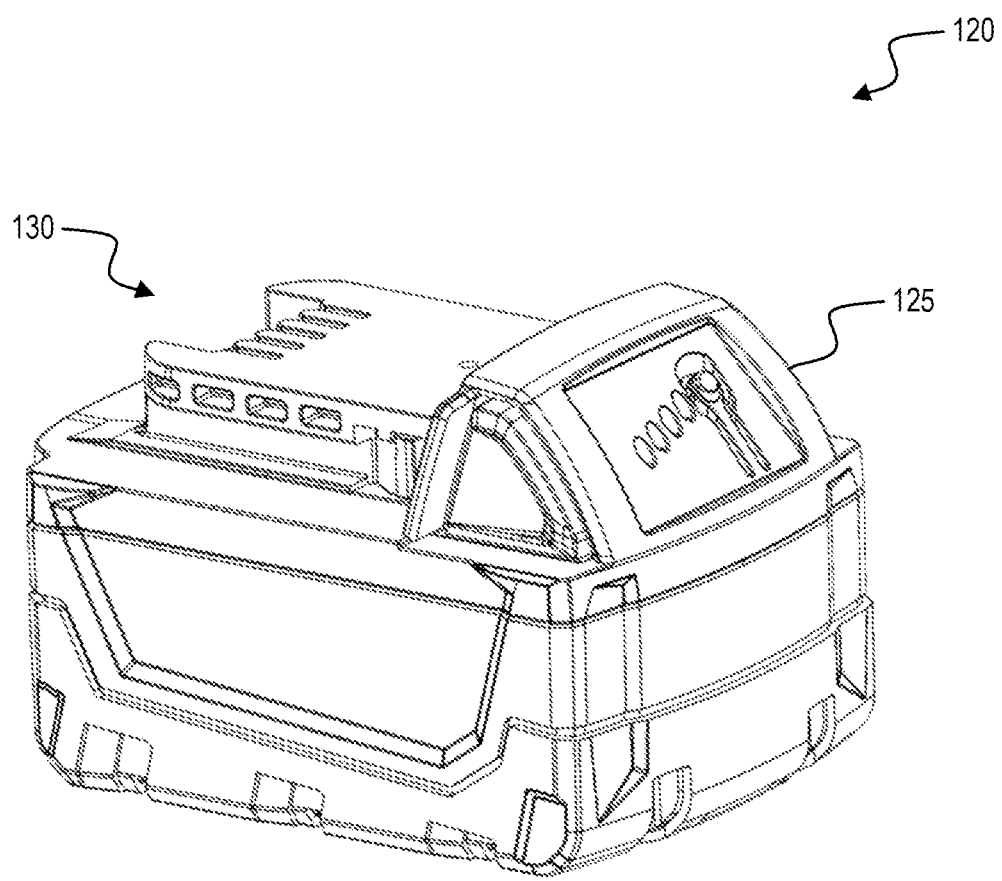
FIG. 2 illustrates a battery pack for powering the power tool of FIG. 1 in accordance with embodiments described herein.

FIG. 2 illustrates a battery pack 120. The battery pack 120 is a power tool battery pack that is generally used to power a power tool, such as power tool 100. The battery pack 120 includes a housing 125 and an interface portion 130 for connecting the battery pack 120 to a device (e.g., the power tool 100 and/or the adapter 150). In some embodiments, the battery pack 120 includes lithium ion battery cells. In other embodiments, the battery pack 120 may be of a different chemistry, for example, nickel-cadmium, nickel-metal hydride, and the like. In some embodiments, the battery cells are cylindrical battery cells, prismatic battery cells, pouch battery cells, or combinations thereof. In the illustrated embodiment, the battery pack 120 is an 18 volt battery pack. In other embodiments, the output voltage level of the battery pack 120 may be different. For example, the battery pack 120 can be a 4 volt battery pack, 28 volt battery pack, 40 volt battery pack, or another voltage. The battery pack 120 may also have various capacities (e.g., 3, 4, 5, 6, 8, or 12 ampere-hours).

The battery pack 120 also includes terminals to connect to the power tool 100. The terminals for the battery pack 120 includes a positive and a negative terminal to provide power to and from the battery pack 120. In some embodiments, the battery pack 120 may include the power regulation unit 270 (see FIG. 4). In some embodiments, the battery pack 120 also includes data terminals to communicate with the power tool 100.

The terminals for the battery pack 120 may provide power to the battery pack 120 from a battery pack charger. In some embodiments, the battery pack 120 may maintain compatibility with a charger via the power regulation unit 270, as described in detail below.

Figure 3:
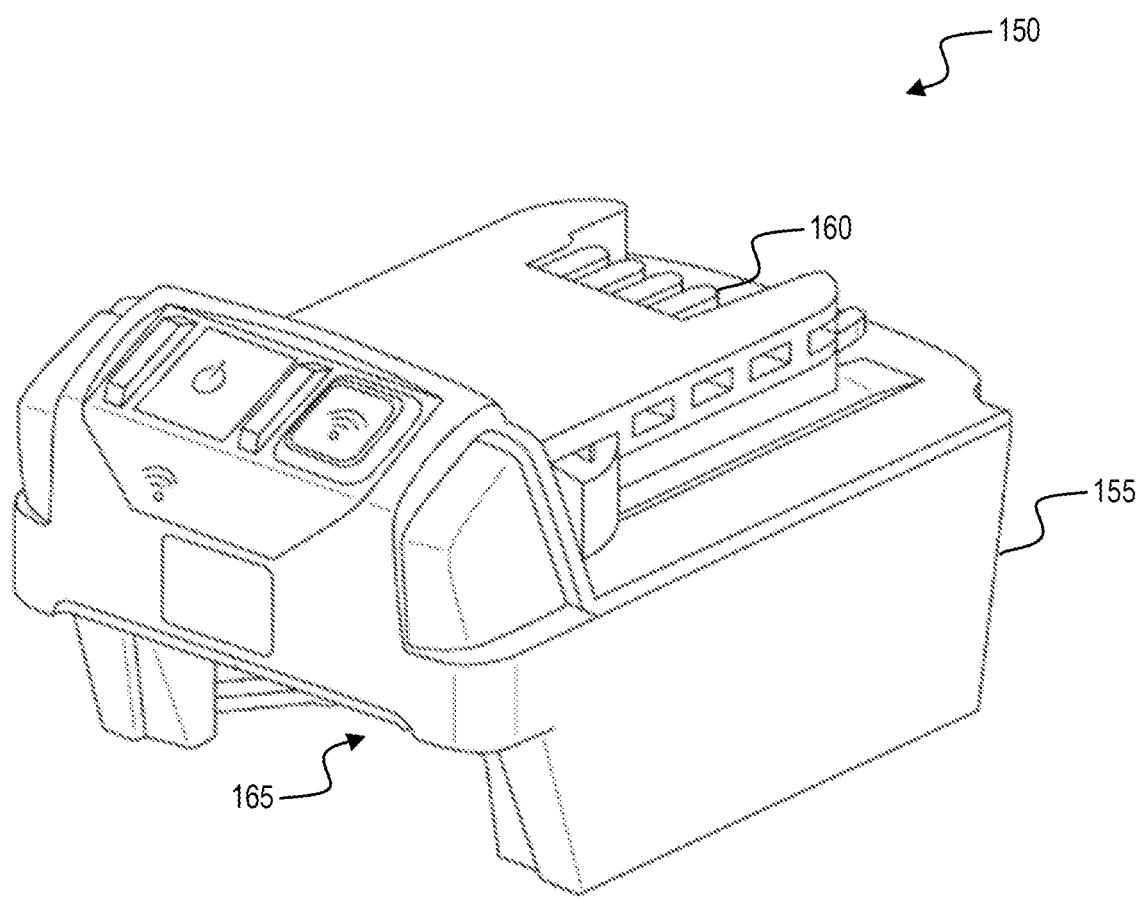
FIG. 3 illustrates an adapter for the power tool of FIG. 1 in accordance with embodiments described herein.

FIG. 3 illustrates an adapter 150. The adapter 150 is a power tool adapter that is generally used between a battery pack (e.g., battery pack 120) and a power tool (e.g., power tool 100). The adapter includes a housing 155, a first interface portion 160 for connecting the adapter 150 to a first device (e.g., the power tool 100 or a battery pack charger), and a second interface portion 165 for connecting the adapter 150 to a second device (e.g., the battery pack 120). In some embodiments, the adapter 150 couples to different power tool devices (e.g., the power tool 100, the battery pack 120, and chargers) to export information from the power tool devices and import information into the power tool devices. The adapter 150, for example, exports tool usage data, maintenance data, mode information, drive device information, and the like from the power tool 100. The adapter 150 also imports information into the power tool 100 such as, for example, configuration data, operation thresholds, maintenance thresholds, mode configurations, programming for the power tool 100, and the like. In general, the adapter 150 creates a communication path between the power tool 100 and the battery pack 120.

Figure 5:
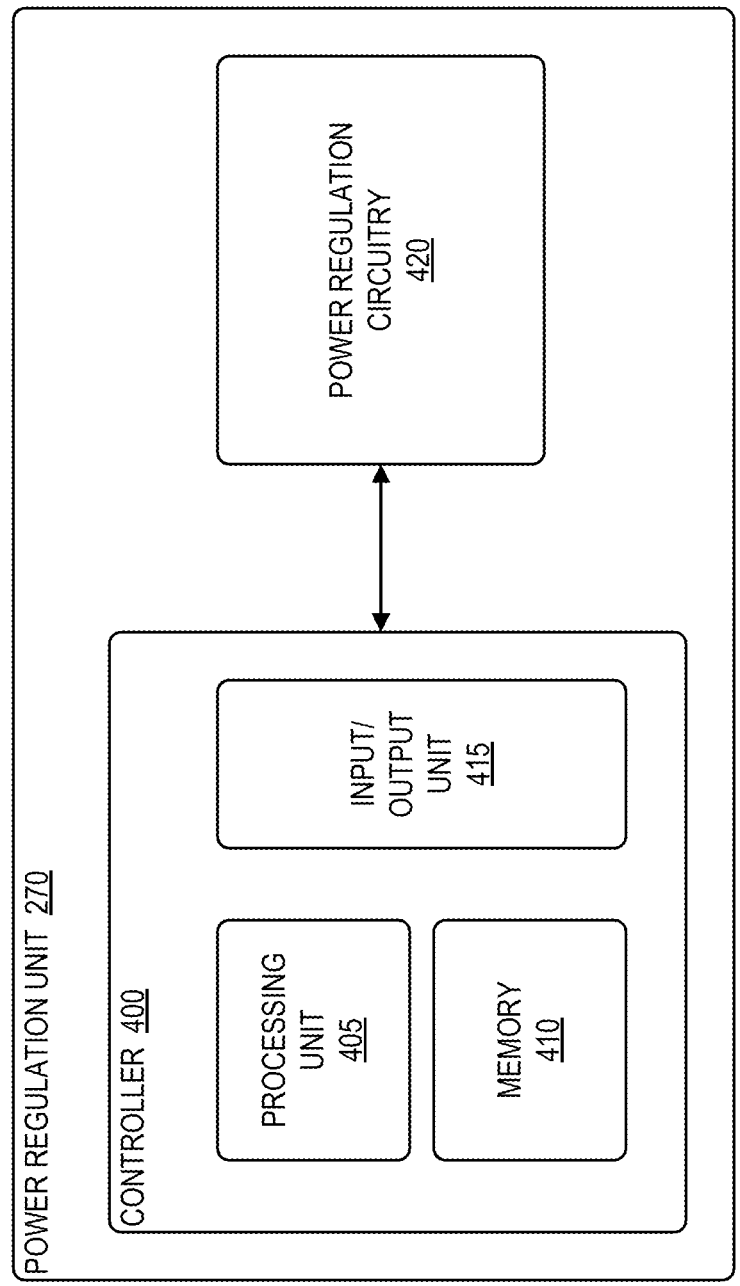
FIG. 5 is a block diagram of a power regulation unit in accordance with embodiments described herein.

In some embodiments, the adapter 150 includes a power regulation unit 270 (see FIG. 5). The power regulation unit 270 within the adapter 150 receives power from the battery pack 120 or the charger, regulates the power, and outputs the regulated voltage to the power tool 100.

Figure 4:
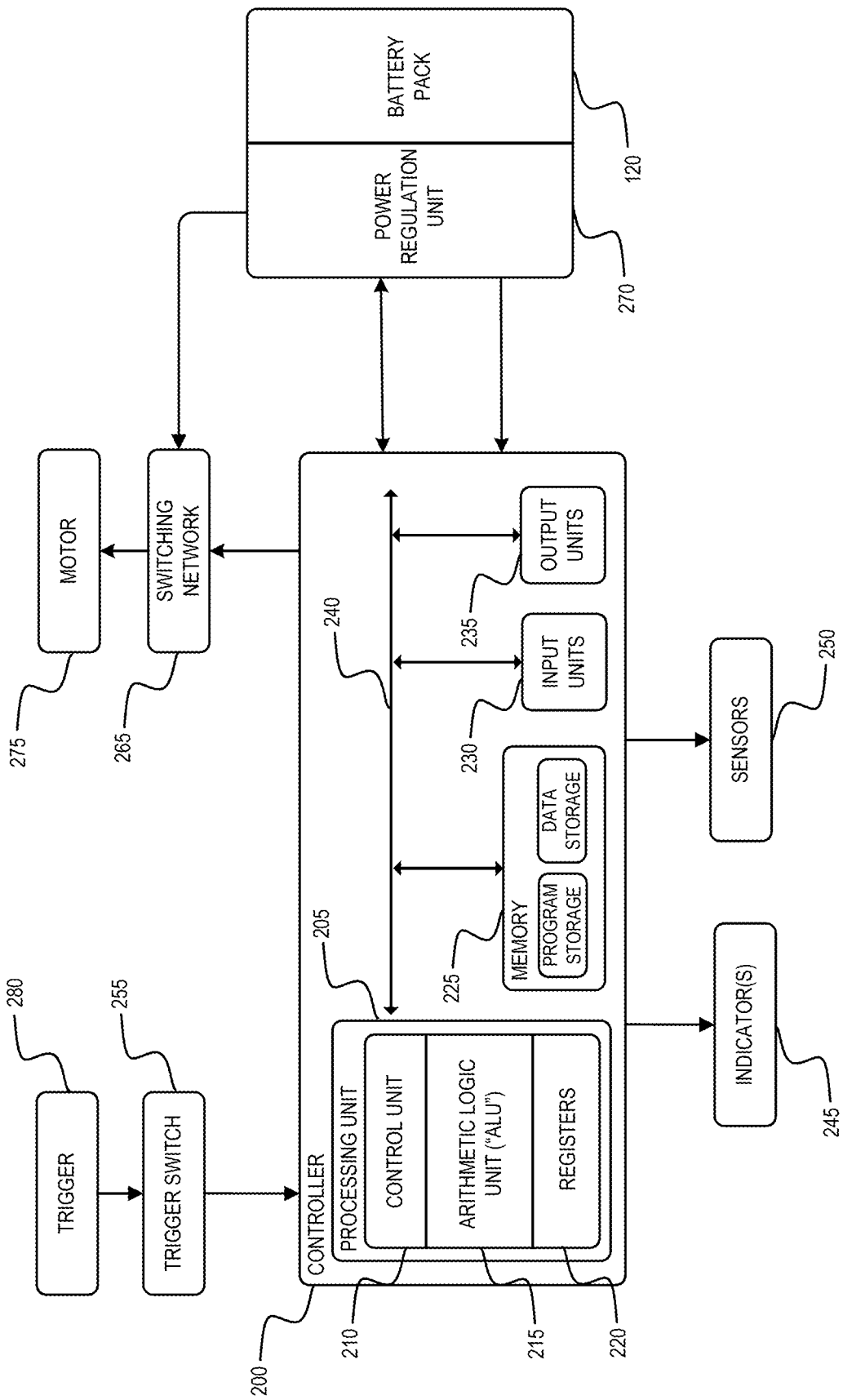
FIG. 4 is a block circuit diagram of the power tool of FIG. 1 in accordance with embodiments described herein.

A controller 200 for the power tool 100 is illustrated in FIG. 4. The controller 200 is electrically and/or communicatively connected to a variety of modules or components of the power tool 100. For example, the illustrated controller 200 is connected to indicators 245, sensors 250 (which may include, for example, a current sensor, a voltage sensor, a trigger pull sensor, a temperature sensor, etc.), a trigger switch 255, a switching network 265, and the power regulation unit 270.

The controller 200 includes a plurality of electrical and electronic components that provide power, operational control, and protection to the components and modules within the controller 200 and/or power tool 100. For example, the controller 200 includes, among other things, a processing unit 205 (e.g., a microprocessor, an electronic processor, an electronic controller, a microcontroller, or another suitable programmable device), a memory 225, input units 230, and output units 235. The processing unit 205 includes, among other things, a control unit 210, an arithmetic logic unit ("ALU") 215, and a plurality of registers 220 (shown as a group of registers in FIG. 4), and is implemented using a known computer architecture (e.g., a modified Harvard architecture, a von Neumann architecture, etc.). The processing unit 205, the memory 225, the input units 230, and the output units 235, as well as the various modules connected to the controller 200 are connected by one or more control and/or data buses (e.g., common bus 240). The control and/or data buses are shown generally in FIG. 4 for illustrative purposes. The use of one or more control and/or data buses for the interconnection between and communication among the various modules and components would be known to a person skilled in the art in view of the embodiments described herein.

The memory 225 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 205 is connected to the memory 225 and executes software instructions that are capable of being stored in a RAM of the memory 225 (e.g., during execution), a ROM of the memory 225 (e.g., on a generally permanent basis), or another non-transitory computer readable medium such as another memory or a disc. Software included in the implementation of the power tool 100 can be stored in the memory 225 of the controller 200.

The software includes, for example, firmware, one or more applications, program data, filters, rules, one or more program modules, and other executable instructions. The controller 200 is configured to retrieve from the memory 225 and execute, among other things, instructions related to the control processes and methods described herein. In other embodiments, the controller 200 includes additional, fewer, or different components.

The motor 275 is energized based on a state of the trigger 280. Generally, when the trigger 280 is activated, the motor 275 is energized, and when the trigger 280 is deactivated, the motor is de-energized. In some embodiments, such as the power tool 100 illustrated in FIG. 1, the trigger 280 extends partially down a length of the handle of the power tool and is moveably coupled to the handle such that the trigger 280 moves with respect to the power tool housing. In the illustrated embodiment, the trigger 280 is coupled to that trigger switch 255 such that when the trigger 280 is depressed, the trigger switch 255 is activated, and when the trigger 280 is released, the trigger switch 255 is deactivated. In the illustrated embodiment, the trigger 280 is biased (e.g., with a biasing member such as a spring) such that the trigger 280 moves in a second direction away from the handle of the power tool 100 when the trigger 280 is released by the user. In other words, the default state of the trigger switch 255 is to be deactivated unless a user presses the trigger 280 and activates the trigger switch 255.

The switching network 265 allows the controller 200 to control the operation of the motor 275. The switching network 265 includes a plurality of electronic switches (e.g., FETs, bipolar transistors, and the like) connected together to form a network that controls the activation of the motor 275 using a pulse-width modulated (PWM) signal. For instance, the switching network 265 may include a six-FET bridge that receives PWM signals from the controller 200 to drive the motor 275. Generally, when the trigger 280 is depressed as indicated by an output of the trigger switch 255, electrical current is supplied from the battery pack 120 to the motor 275 via the switching network 265. When the trigger 280 is not depressed, electrical current is not supplied from the batter pack 120 to the motor 275. As discussed in more detail below, in some embodiments, the amount of trigger pull detected by the trigger switch 255 is related to or corresponds to a desired speed of rotation of the motor 275. In other embodiments, the amount of trigger pull corresponds to a desired torque.

A battery pack interface is connected to the controller 200 and couples to the battery pack 120. The battery pack interface includes a combination of mechanical (e.g., a battery pack receiving portion) and electrical components configured to and operable for interfacing (e.g., mechanically, electrically, and communicatively connecting) the power tool 100 with the battery pack 120. In some embodiments, the battery pack interface includes the power regulation unit 270. The power regulation unit 270 regulates power from the battery pack 120 to the power tool 100. The power regulation unit 270 will be further described with respect to FIG. 5.

The indicators 245 are also coupled to the controller 200 and receive control signals from the controller 200 to turn on and off or otherwise convey information based on different states of the power tool 100. The indicators 245 include, for example, one or more light-emitting diodes (LEDs), or a display screen (e.g., an LCD display). The indicators 245 can be configured to display conditions of, or information associated with, the power tool 100. For example, the indicators 245 can display information relating to the power need by or provided to the power tool 100. In addition to or in place of visual indicators, the indicators 245 may also include a speaker or a tactile feedback mechanism to convey information to a user through audible or tactile outputs.

The sensors 250 are coupled to the controller 200 and communicate to the controller 200 various output signals indicative of different parameters of the power tool 100 or the motor 275. The sensors 250 include, for example, position or movement sensors, Hall Effect sensors, motor current sensors, motor voltage sensors, motor position sensors, temperature sensors, torque sensors, trigger pull sensors, lasers, ultrasonic sensors, and the like.

The controller 200 receives input signals from the trigger pull sensor to sense that the trigger 280 is being actuated and to what extent it is being actuated. For example, the trigger pull sensor senses the amount that the trigger is pulled and/or the force with which the trigger is pulled. The controller 200 also receives inputs from the motor current sensors, motor voltage sensors, and torque sensors to determine how the motor 275 is being operated and for what application. For example, the motor current sensors, motor voltage sensors, and torque sensors monitor parameters of the motor 275 to determine how long the motor 275 has been operated, at what speed, and under what load.

The power regulation unit 270 is illustrated in FIG. 5. The power regulation unit 270 includes a controller 400 and power regulation circuitry 420. The controller 400 includes a processing unit 405, memory 410, and an input/output unit 415. The processing unit 405 for the power regulation unit 270 controls the power regulation circuitry 420 to regulate the power provided to the power tool 100 based on a desired power tool 100 operation. For example, based on the amount of trigger pull as sensed by the trigger sensor that is coupled to the trigger switch 255, the power tool 100 may request a constant amount of power from the battery pack 120 as the load on the power tool 100 increases. Thus, the processing unit 405 of the power regulation unit 270 may negotiate with the battery pack 120 to provide the requested power to the power tool 100. The memory 410 may serve to store the previously performed power regulation such that the power regulation unit 270 may easily recall power regulation that was previously performed. The input/output unit 415 serves to communicate with the various components of the device that the power regulation unit 270 is integrated within and coupled to. The power regulation circuitry 420 includes circuit components such as resistors, inductors, capacitors, MOSFETs, voltage regulators, etc. (see, e.g., FIGS. 7A-7C). The power regulation circuitry 420 serves to implement the desired power regulation through the use of the circuit components. The power regulation circuitry 420 communicates with the processing unit 405 to implement the required power regulation using the circuit components.

The power regulation unit 270 regulates power to a power tool by fixing the voltage output to the power tool, limiting the current output to the power tool, forcing shutoff when the battery is overloaded, negotiating the desired voltage, current, or power from the battery pack, automatically calibrating the load line to the power tool, negotiating the load line calibration to the power tool, supporting non-standard cell chemistries and non-standard cell configurations, etc.

Figure 6A:
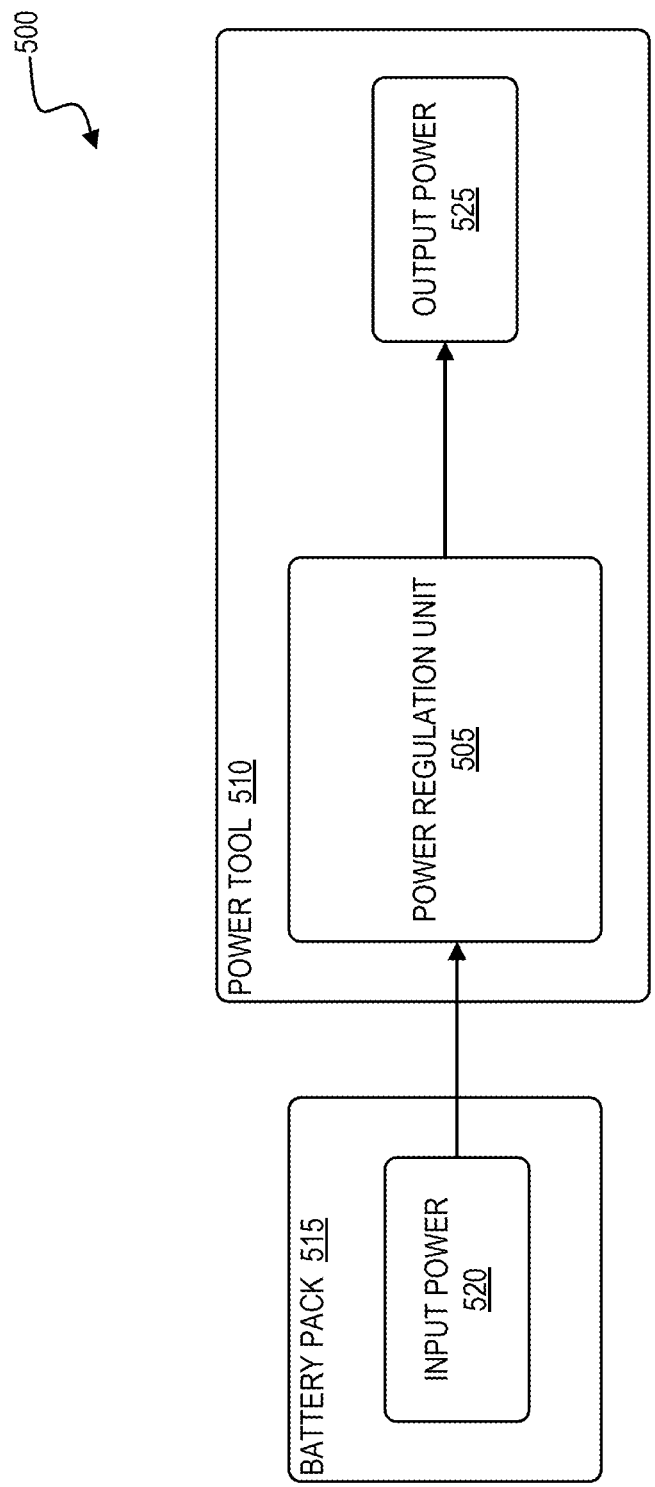
FIG. 6A is a block diagram of the power regulation unit of the power tool of FIG. 1 in accordance with embodiments described herein.

The power regulation unit 270 may also regulate power received from a battery pack charger that charges the battery cells of the battery pack 120. In some embodiments, the power regulation circuitry 420 regulates a voltage received from the charger to a rated voltage of the battery pack 120. In some embodiments, the power regulation unit 270 may include additional circuitry (separate from the power regulation circuitry 420 that regulates the power output to the power tool) that regulates the power received from the charger. The power regulation unit 270 maintains compatibility between the battery pack 120 and a battery pack charger, even in the case that the charger is not rated at the same voltage as the battery pack 120. For example, the battery pack 120 may be rated as a 36 volt battery pack that has a 41 volt maximum charge capacity and the battery pack charger may be conventionally rated for an 18 volt battery pack (e.g., providing 20.5 volts for charging). The power regulation unit 270 is configured to, for example, step up the voltage (e.g., act as a boost circuit) during charging to provide a voltage that charges the battery pack 120. Additionally or alternatively, the power regulation unit 270 is configured to, for example, step down the voltage (e.g., act as a buck circuit) during charging to provide a voltage that charges the battery pack 120. FIG. 6A is a block diagram of a representative power regulation system 500 for a power tool battery pack according to one embodiment. The power regulation system 500 includes a power regulation unit 505 within a power tool 510 and a battery pack 515. The battery pack 515 provides input power 520 to the power regulation unit 505 within the power tool 510. The power regulation unit 505 regulates the input power 520 and outputs the regulated power as output power 525. The output power 525 powers, among other things, a motor (e.g., motor 275) so the power tool 100 may perform power tool operations.

Figure 6B:
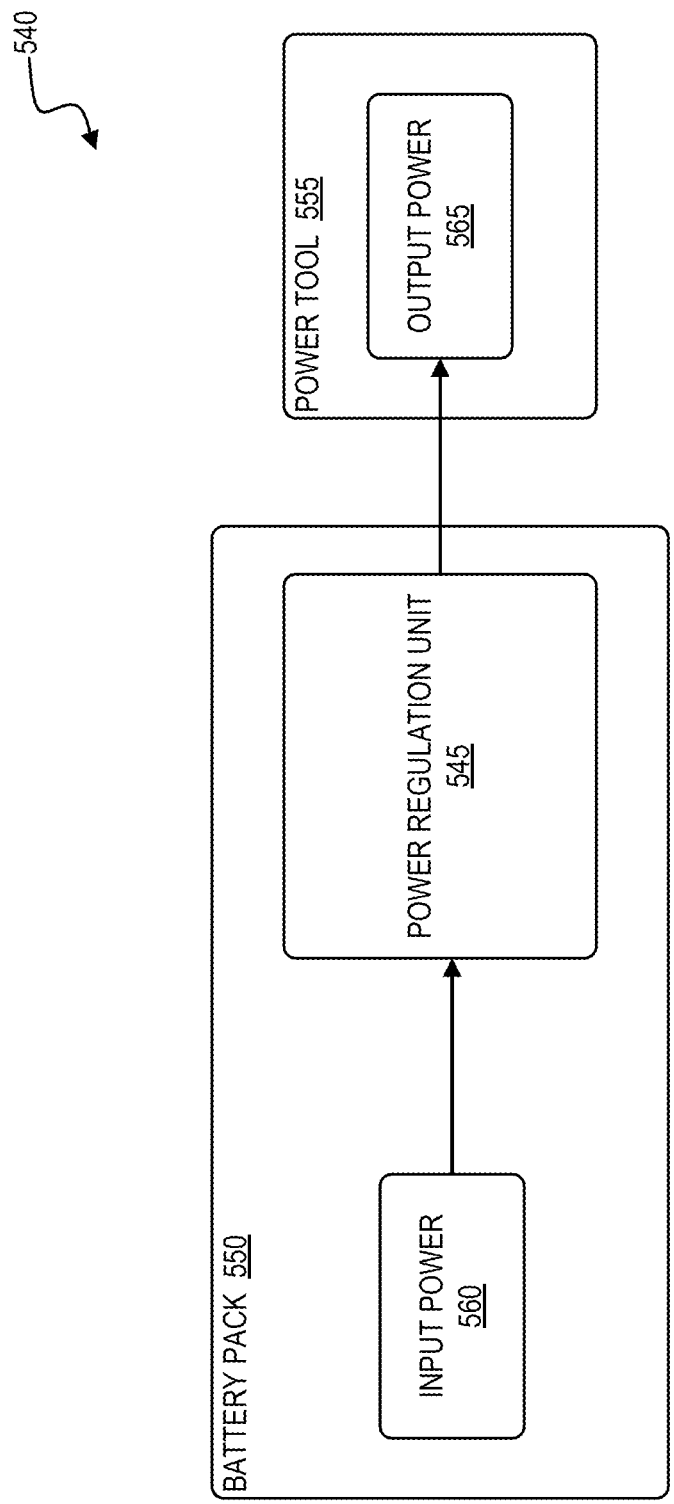
FIG. 6B is a block diagram of the power regulation unit of the battery pack of FIG. 2 in accordance with embodiments described herein.

FIG. 6B is a block diagram of a representative power regulation system 540 for a power tool battery pack according to one embodiment. The power regulation system 540 includes a power regulation unit 545 within a battery pack 550 and a power tool 555. The battery pack 550 provides input power 560 to the power regulation unit 545 within the battery pack 550. The power regulation unit 545 regulates the input power 560 and outputs the regulated power as output power 565 to the power tool 555.

Figure 6C:
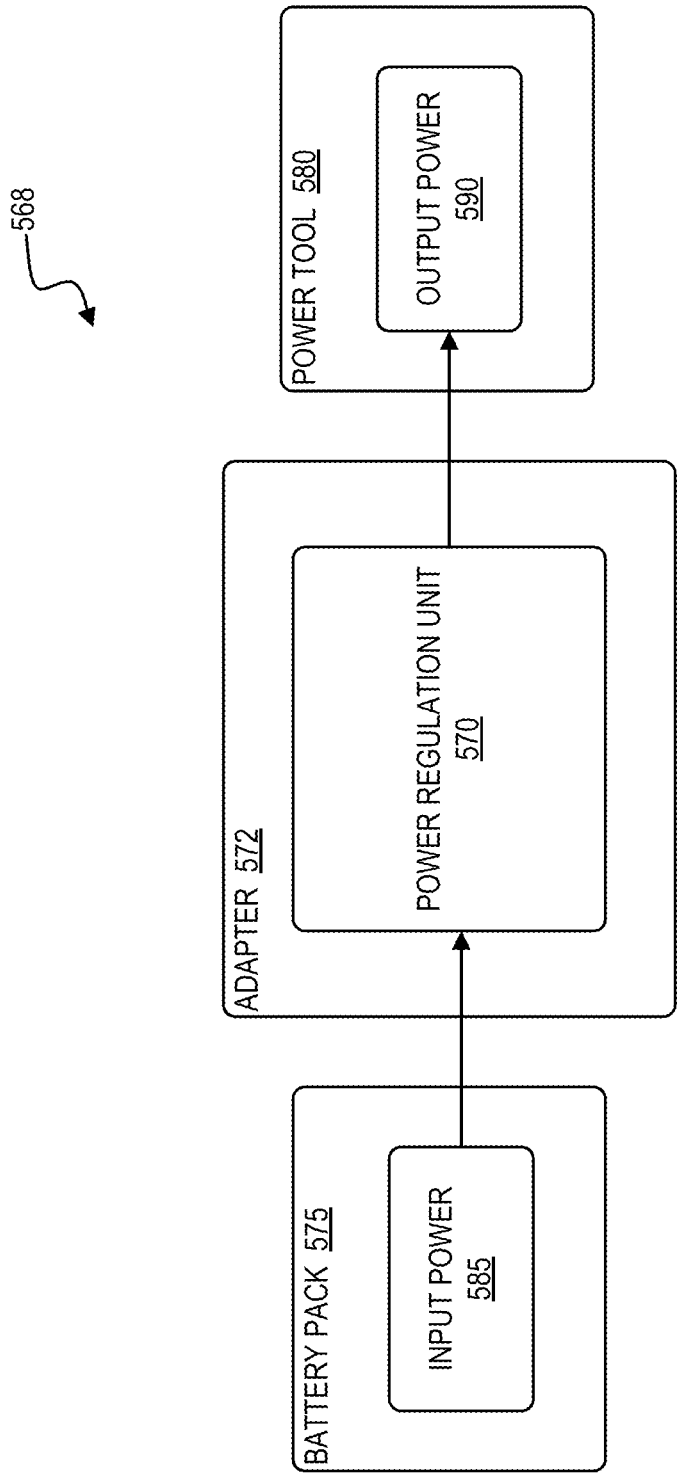
FIG. 6C is a block diagram of the power regulation unit of the adapter of FIG. 3 in accordance with embodiments described herein.

FIG. 6C is a block diagram of a representative power regulation system 568 for a power tool battery pack according to one embodiment. The power regulation system 568 includes a power regulation unit 570 within an adapter 572 (e.g., similar to adapter 150), a battery pack 575, and a power tool 580. The battery pack 575 provides input power 585 to the power regulation unit 570 within the adapter 572. The power regulation unit 570 regulates the input power 585 and outputs the regulated power as output power 590 to the power tool 580.

FIG. 6D is a block diagram of a representative power regulation system 592 for a power tool battery pack according to one embodiment. The power regulation system 592 includes a power regulation unit 595 within an adapter 600 (e.g., similar to adapter 150), a battery pack charger 605, and a battery pack 610. The battery pack charger 605 provides input power 615 to the power regulation unit 595 within the adapter 600. The power regulation unit 595 regulates the input power 615 and outputs the regulated power as output power 620 to the battery pack 610.

Figure 6E:
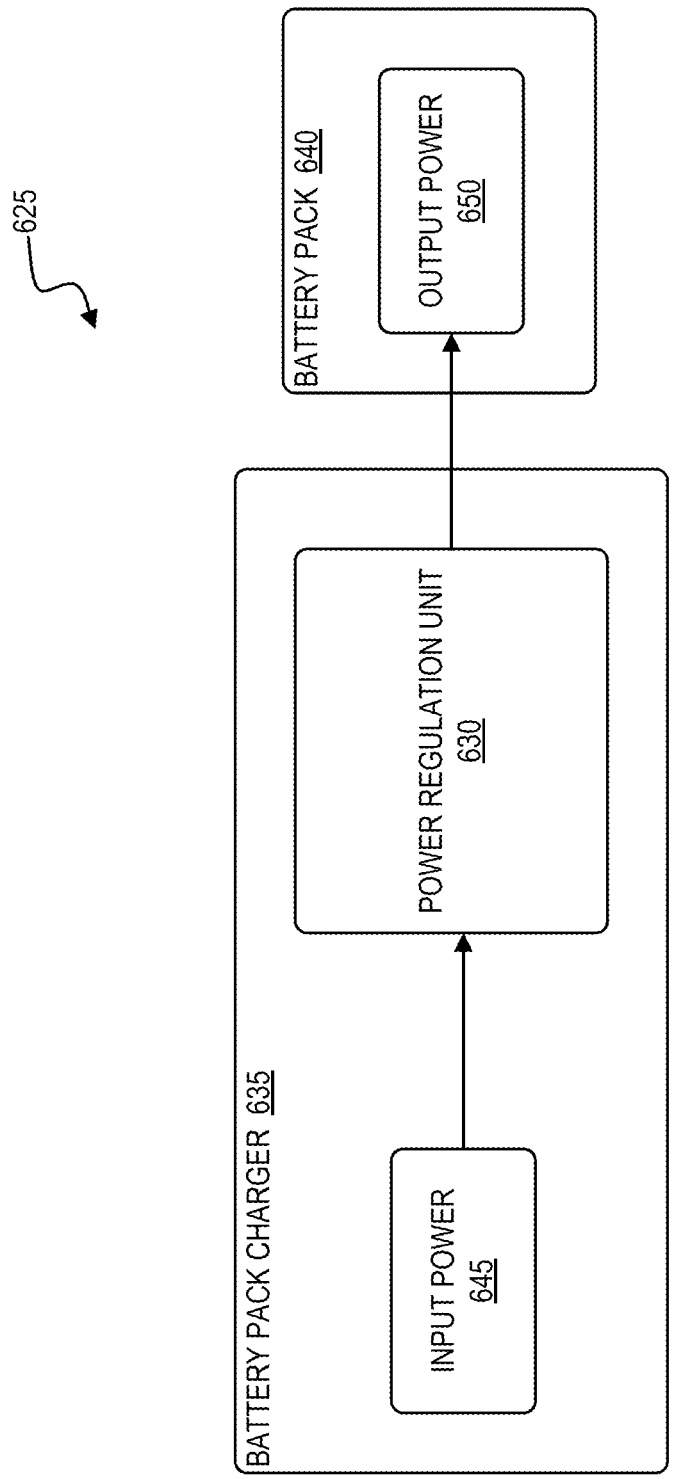
FIG. 6E is a block diagram of the power regulation unit of a battery pack charger in accordance with embodiments described herein.

FIG. 6E is a block diagram of a representative power regulation system 625 for a power tool battery pack according to one embodiment. The power regulation system 625 includes a power regulation unit 630 within a battery pack charger 635 and a battery pack 640. The battery pack charger 635 provides input power 645 to the power regulation unit 630 within the battery pack charger 635. The power regulation unit 630 regulates the input power 645 and outputs the regulated power as output power 650 to the battery pack 640.

Figure 6F:
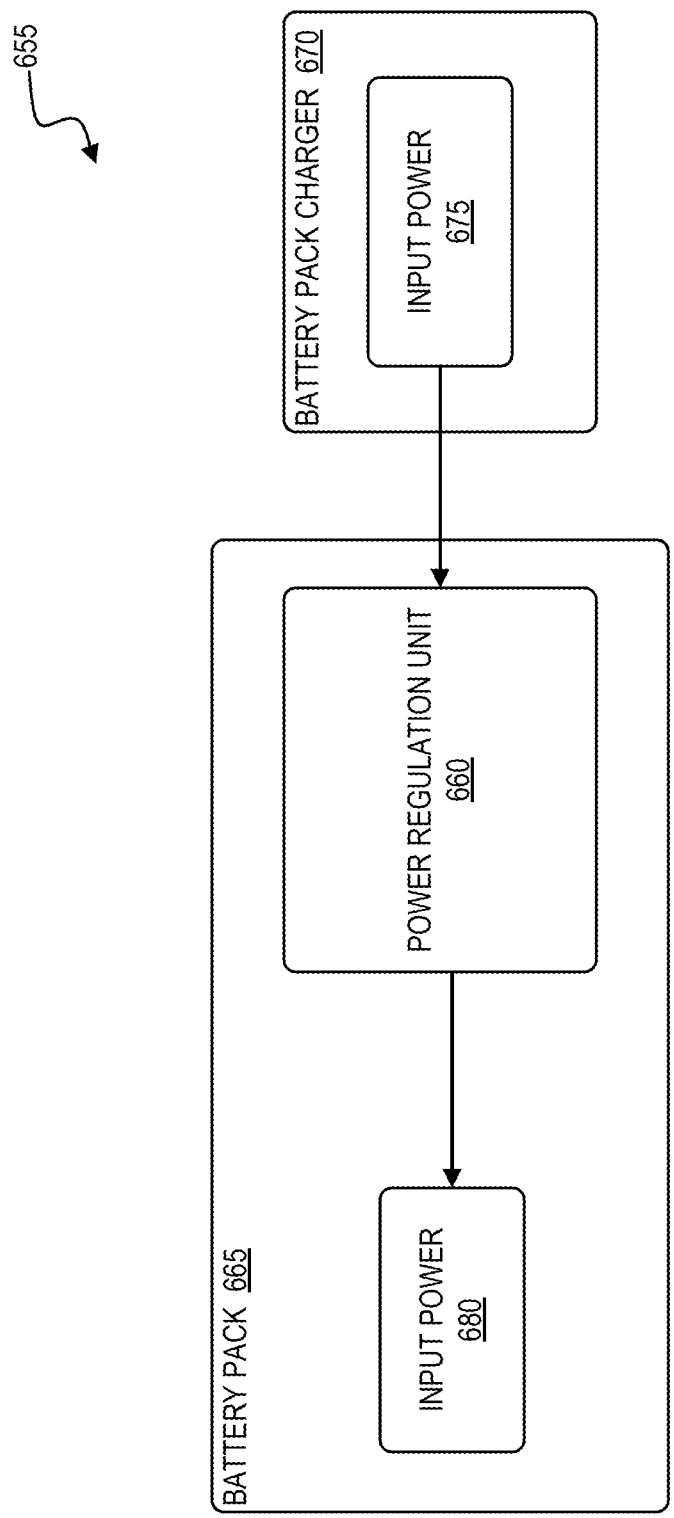
FIG. 6F is a block diagram of the power regulation unit of a battery pack in accordance with embodiments described herein.

FIG. 6F is a block diagram of a representative power regulation system 655 for a power tool battery pack according to one embodiment. The power regulation system 655 includes a power regulation unit 660 within a battery pack 665 and a battery pack charger 670. The battery pack charger 670 provides input power 675 to the power regulation unit 660 within the battery pack 665. The power regulation unit 660 regulates the input power 675 and outputs the regulated power as output power 680 for charging the battery pack 665.

Figure 7A:
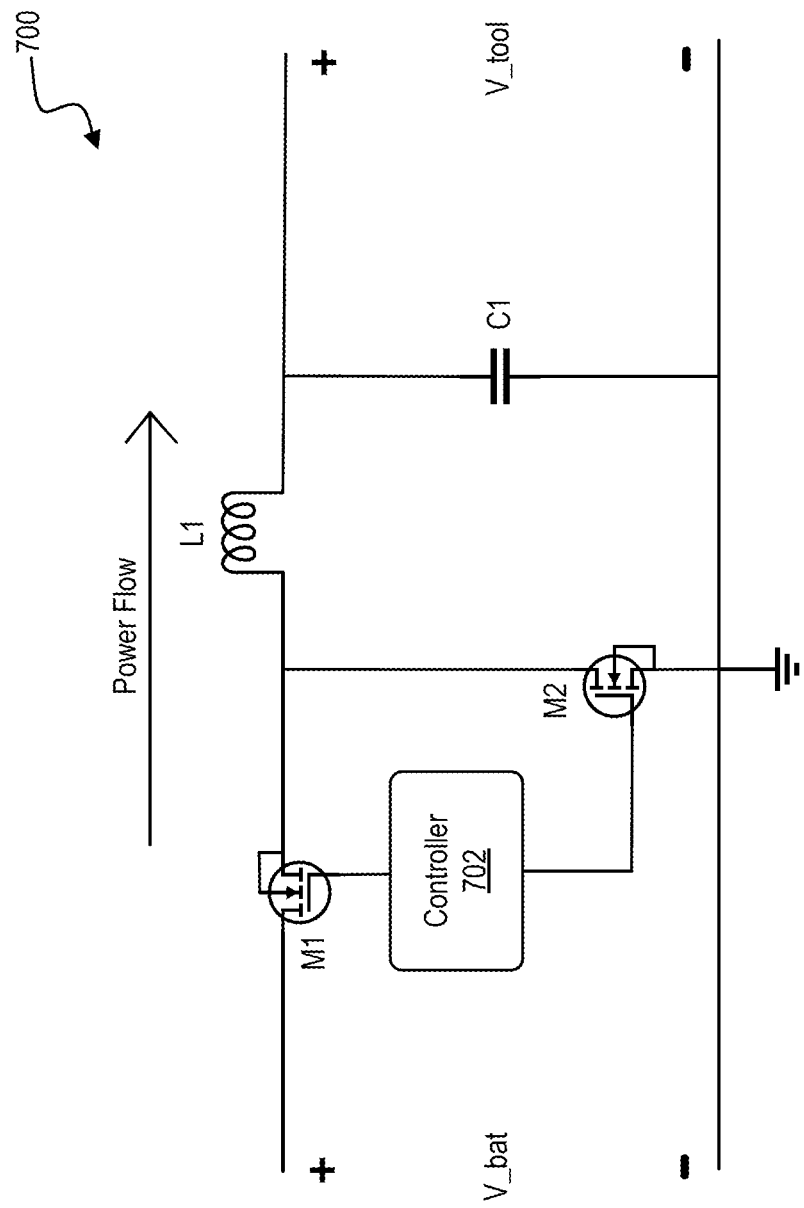
FIG. 7A illustrates a circuit diagram of a reversable power regulator in a discharge mode in accordance with embodiments described herein.
Figure 7B:
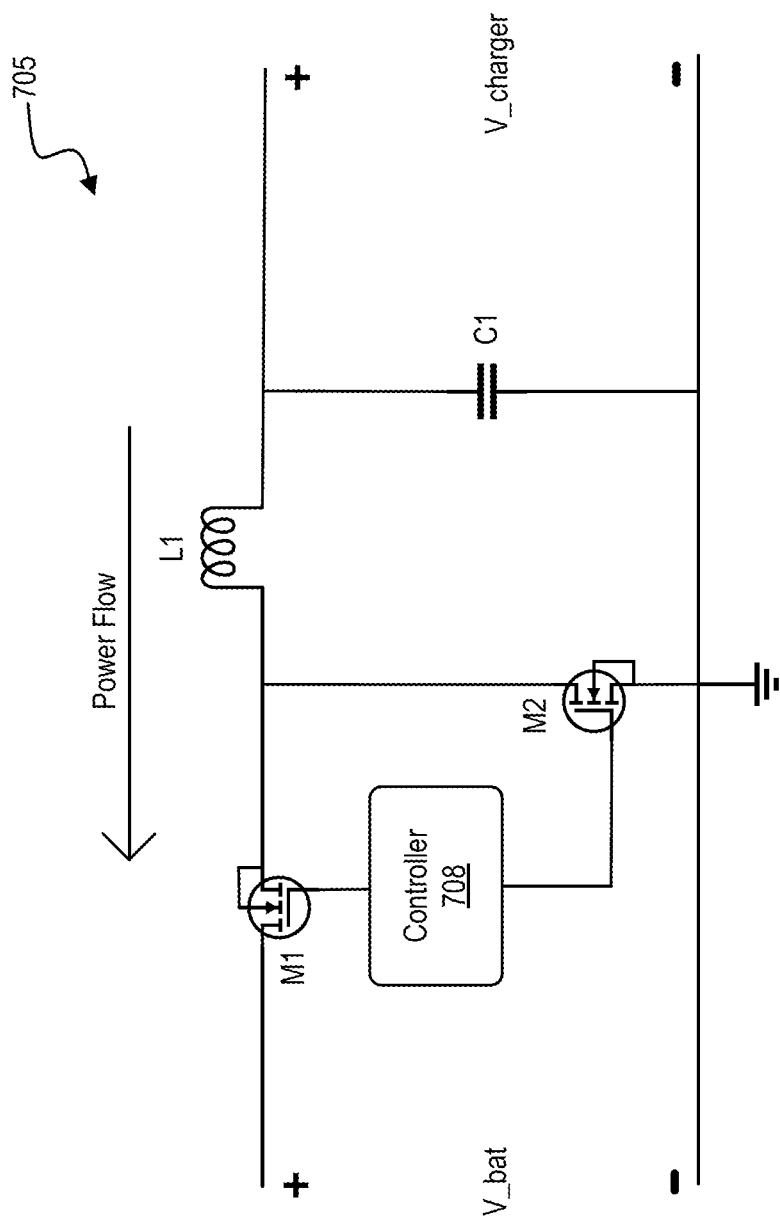
FIG. 7B illustrates a circuit diagram of the reversable power regulator in a charge mode in accordance with embodiments described herein.
Figure 7C:
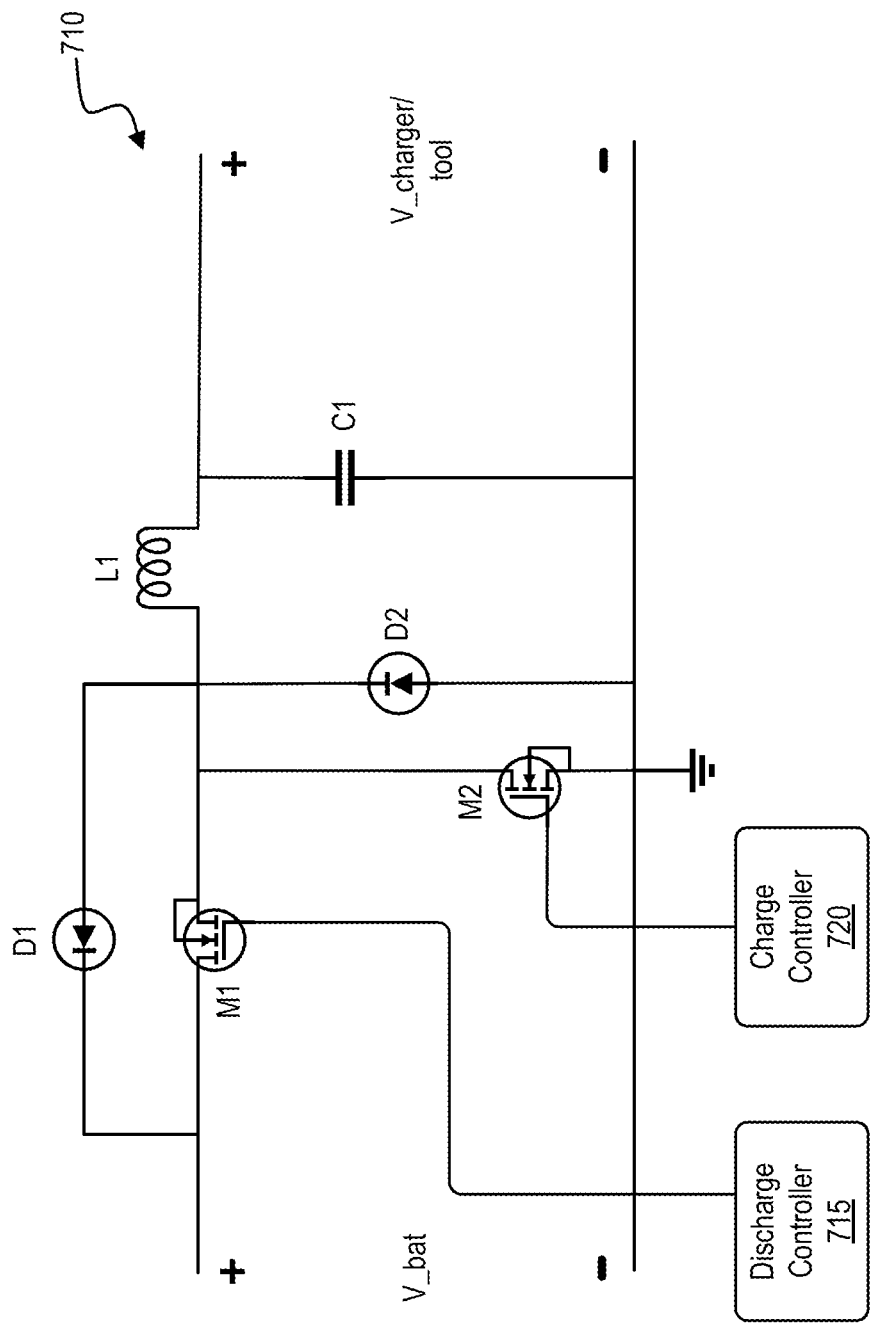
FIG. 7C illustrates a circuit diagram of a power regulation unit including a discrete controller in accordance with embodiments described herein.

FIGS. 7A-7C illustrate circuit topologies for a power regulation unit. In particular, FIGS. 7A and 7B illustrate a circuit of a reversable power regulation unit that uses the same components in both a discharge mode and a charge mode. The power regulation unit may include circuitry that is reversable and, thus, allows for bi-directional power flow. FIG. 7C illustrates a circuit of power regulation unit with a discrete controller.

As mentioned above, FIG. 7A illustrates a circuit diagram of a power regulation unit 700 in a discharge mode. For example, the power regulation unit 700 may be within a power tool (e.g., power tool 100), a battery pack (e.g., battery pack 120), or an adapter (e.g., adapter 150) coupled to the battery pack. In the discharge mode, the power regulation unit 700 discharges power stored within the battery cell(s) of the battery pack to a power tool (e.g., power tool 100). The power regulation unit 700 includes a controller 702, a battery voltage (e.g., from battery pack 120), switches M1, M2, an inductor L1, and a capacitor C1. The controller 702 (e.g., controller 400) may be one of a microcomputing unit (MCU), a field programmable gate array (FPGA), an integrated controller (IC), and the like. The switches may be FETs, MOSFETs, BJTs, diodes, and the like. The battery voltage may be received from the battery pack.

As illustrated in the circuit diagram, power flows from the battery (i.e., V_bat) to the power tool 100. In some embodiments, the power from the regulator is used to power the motor (e.g., motor 275) of the power tool 100 (i.e., V_tool). During the discharge mode, the controller 702 controls the circuit to operate in, for example, either a boost or buck mode. For example, the input voltage from the battery is greater than the output voltage to the power tool 100. Thus, the power input from the battery may be greater than the power output to the power tool.

FIG. 7B illustrates a circuit diagram of a power regulation unit 705 in a charge mode. For example, the power regulation unit 705 may be within a battery pack (e.g., battery pack 120) or a battery pack charger. In the charge mode, the power regulation unit 705 is charged using input power from a battery pack charger. The power regulation unit 705 includes a controller 708, a battery voltage (e.g., in the battery pack 120), switches M1, M2, an inductor L1, and a capacitor C1. The controller 708 (e.g., controller 400) may be one of a microcomputing unit (MCU), a field programmable gate array (FPGA), an integrated controller (IC), and the like. The switches may be FETs, MOSFETs, BJTs, diodes, and the like.

As illustrated in the circuit diagram, power flows from the charger to the battery pack. During the charge mode, the controller 708 controls the circuit to operate in, for example, either a boost or buck mode. For example, the input voltage from the charger is less than the output voltage provided to the battery. Thus, the power input from the battery pack charger may be less than the power of the battery pack. This allows a greater charging power to be provided to the battery pack than would be available from the charger alone. In the case that the controller 708 controls the circuit in a boost mode during the charge mode (e.g., stepping-up the voltage from the charger), power flows through the circuit components of the power regulation unit 705 in a first direction. Subsequently, when the battery is discharged and power flows through the circuit components of the power regulation unit 705 in a second direction, the controller 708 controls the circuit in, for example, a buck mode. For example, the circuit components of the power regulation unit 705 are bidirectional and can operate in both the boost mode and the buck mode, thus allowing for compatibility between a battery pack and both power tools and battery pack chargers.

The power regulation units 700, 705 of FIGS. 7A and 7B use the same circuit components for the discharging and charging processes. The minimizes the bill of materials (BOM) cost as well as the size for the charging and discharging of the power regulation unit. The controller 702, 708 is able to change the mode that the power regulation unit 700, 705 is operating in based on whether the power regulation unit 700, 705 is coupled to the power tool or the battery pack charger (e.g., based on communication with the power tool or battery pack charger).

FIG. 7C illustrates a circuit diagram of a power regulation unit 710 including discrete controllers. For example, the power regulation unit 700 may be within a battery pack (e.g., battery pack 120), an adapter (e.g., adapter 150) coupled to the battery pack, or a battery pack charger. The discrete controllers include a discharge controller 715 (e.g., controller 400) and a charge controller 720 (e.g., controller 400). In addition, the power regulation unit 710 includes a battery voltage (e.g., within battery pack 120), switches M1, M2, diodes D1, D2, an inductor L1, and a capacitor C1. Either the discharge controller 715 or the charge controller 720 can be operated at any given time.

The discharge controller 715 operates when the power regulation unit 710 is in a discharge mode. For example, the power regulation unit 710 operates in a discharge mode when the battery pack is coupled to a power tool and is providing power to the power tool. Thus, discharging the battery cells of the battery pack. In some embodiments, during discharging, the discharge controller 715 creates a non-synchronous buck converter using switch M1 and diode D2.

Alternatively, the charge controller 720 operates when the power regulation unit 710 is in a charge mode. For example, the power regulation unit 710 operates in a charge mode when the battery pack is coupled to a battery pack charger. Thus, charging the battery cell(s) of the battery pack. In some embodiments, during charging, the charge controller 720 creates a non-synchronous boost converter using switch M2 and diode D1.

Figure 8:
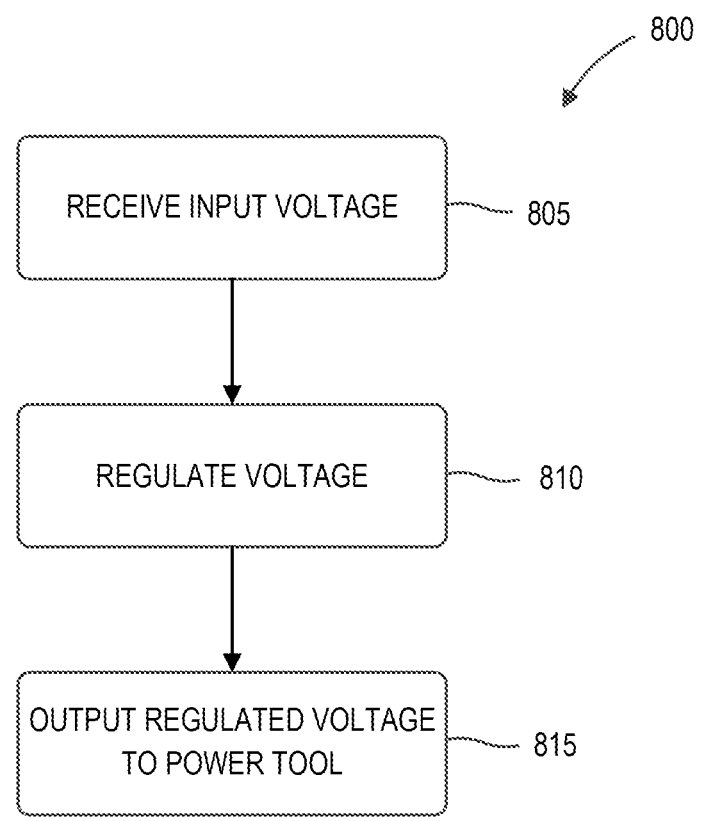
FIG. 8 is a flowchart illustrating a method of regulating voltage by the power regulation unit in accordance with embodiments described herein.

FIG. 8 is a flowchart illustrating a method 800 of operating the power regulation unit 270 according to the embodiments described herein. In step 805, the controller 400 of the power regulation unit 270 receives an input voltage from the battery pack 120. For example, the input voltage may be within a range of 12-16V from a 12V battery pack or within a range of 18-22V from an 18V battery pack. In step 810, the power regulation unit 270 regulates the input voltage. In some embodiments, the controller 400 regulates the power by fixing the voltage at a value below the maximum of the range of the input voltage from a battery pack. In other embodiments, the controller 400 regulates the power by fixing the voltage at a value above the range of input voltage from the battery pack. In step 815, the power regulation unit 270 outputs the regulated power to the power tool 100. For example, for an 18V battery pack with an expected output around in the range of 18-22V, the power regulation unit may output a steady 20.5V, regardless of the increasing power tool current or decreasing battery pack voltage. The regulated voltage will not drop as the battery pack 120 becomes discharged or if the power tool 100 experiences an increased load. The regulated voltage allows for greater power output by the power tool 100. A similar reverse operation can be performed when a battery pack charger is providing charging power to a battery pack.

Figure 9:
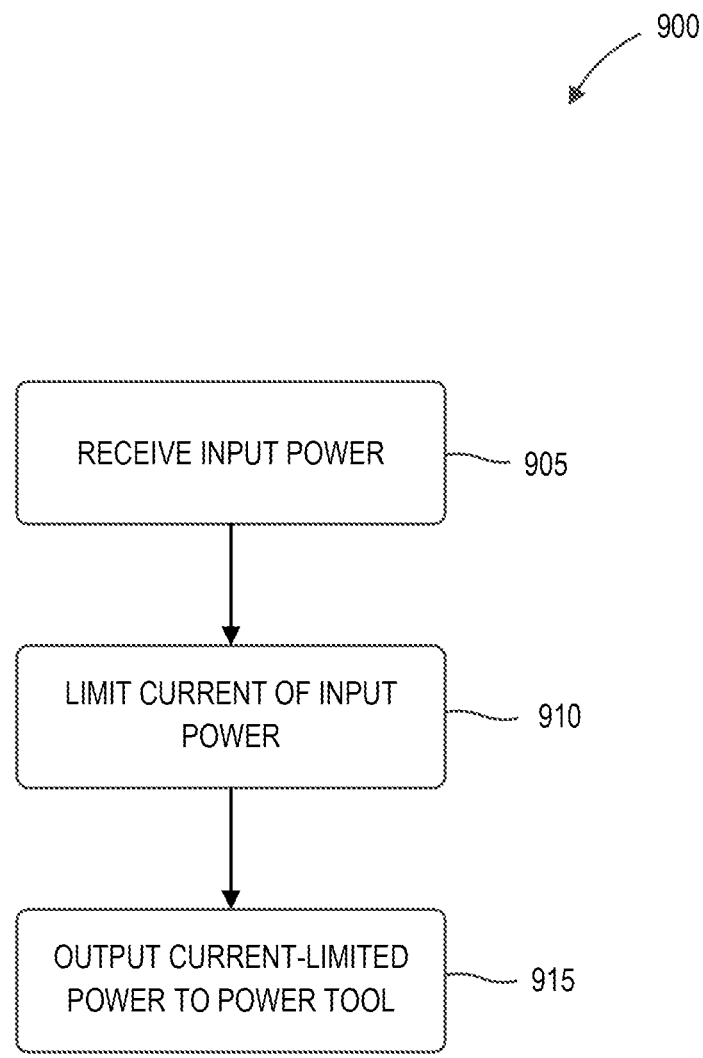
FIG. 9 is a flowchart illustrating a method of limiting current by the power regulation unit in accordance with embodiments described herein.

FIG. 9 is a flowchart illustrating a method 900 of operating the power regulation unit 270 according to the embodiments described herein. In step 905, the controller 400 of the power regulation unit 270 receives an input power from the battery pack 120. For example, the input power may include voltages within a range of 12-16V from a 12V battery pack or within a range of 18-22V from an 18V battery pack. In step 910, the power regulation unit 270 sets a current limit for the input power. In some embodiments, the controller 400 regulates the power by applying a current limit to the input power such that when the power tool hits a predetermined value of current (e.g., 100 A), the controller prevents the current provided to the power tool from exceeding the predetermined value (e.g., by regulating output voltage). In step 915, the power regulation unit 270 outputs the current-limited power to the power tool 100. For example, for an 18V battery pack with a constant output of 20.5V, the power regulation unit 270 outputs 20.5V from the battery pack 120 until the power tool current reaches the predetermined value (e.g., 100 A). The power regulation unit 270 then prevents the current provided to the power tool from exceeding 100 A. Current-limiting the power provided to the power tools allows for protection for power tools that are not designed to run on extremely low impedance battery packs. Additionally, current-limiting the power allows for a softer overload to be driven by the battery pack. A similar reverse operation can be performed when a battery pack charger is providing charging power to a battery pack.

Figure 10:
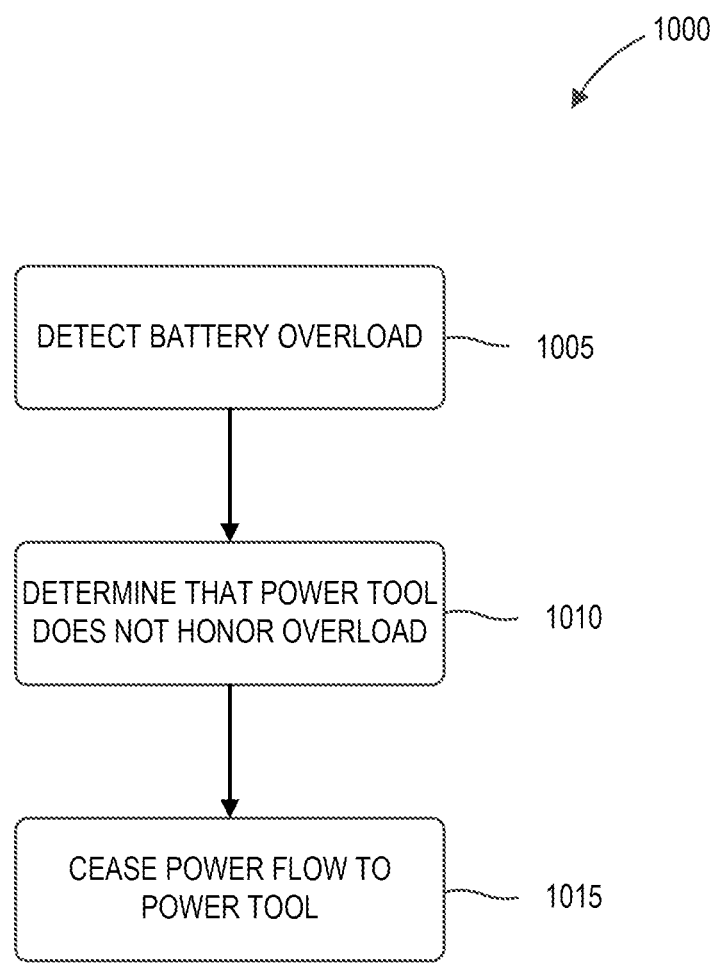
FIG. 10 is a flowchart illustrating a method of determining that the power tool does not honor overload in accordance with embodiments described herein.

FIG. 10 is a flowchart illustrating a method 1000 of operating power regulation unit 270 according to the embodiments described herein. In step 1005, the controller 400 of the power regulation unit 270 detects that the battery pack 120 is overloaded. For example, the controller 400 may detect that the power tool 100 is drawing too much power or current from the battery pack 120 such that the operation of the battery pack 120 is unstable and could cause damage to the battery pack 120 or the power tool 100. In step 1010, the controller 400 of the power regulation unit 270 determines that the power tool 100 does not honor overload (e.g., power tool 100 continued to operate past the point where it should have shutdown). In step 1015, the controller 400 of the power regulation unit 270 ceases power flow to the power tool 100 in response to the power tool 100 not honoring overload. The power regulation unit 270 prevents the power tool 100 from operating when the power tool 100 does not honor overload.

Figure 11:
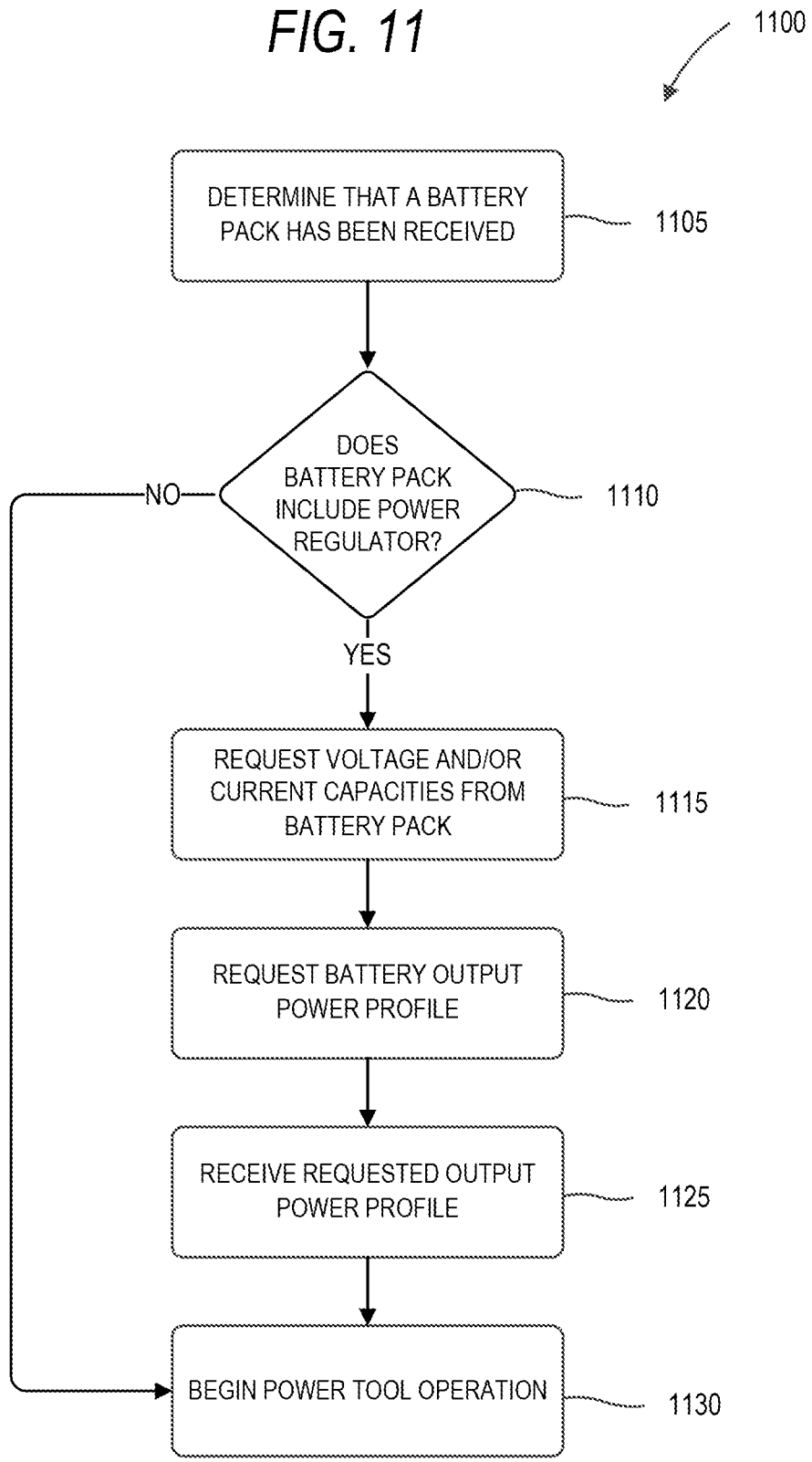
FIG. 11 is a flowchart illustrating a method of negotiating power tool voltage in accordance with embodiments described herein.

FIG. 11 is a flowchart illustrating a method 1100 of operating power tool 100 according to the embodiments described herein. In step 1105, the controller 200 of the power tool 100 (or controller 400 of power regulation unit 270) determines that the battery pack 120 has been received by the power tool 100. For example, the controller 200 may determine that a voltage or current is present due to the battery pack 120 being coupled to the power tool 100. In step 1110, the controller 200 determines whether the battery pack 120 includes the power regulation unit 270. If the controller 200 determines that the battery pack 120 does not include the power regulation unit 270, the method 1100 proceeds to step 1130. At step 1110, if the controller 200 determines that the battery pack 120 does include the power regulation unit 270, then the method 1100 proceeds to step 1115.

In step 1115, the controller 200 of the power tool 100 requests parameters (e.g., voltage, current capacities, etc.) from the battery pack 120. For example, battery pack 120 may be rated as an 18V battery pack and that information is communicated to the controller 200. In step 1120, the power tool 100 requests a battery output power profile from the battery pack 120. For example, the power tool 100 may request a higher or lower voltage than the normal operating voltage of the battery pack 120. In some embodiments, the power tool 100 may request a max voltage, the source impedance, and the overload behavior of the battery pack 120. For example, the max voltage may be the maximum rated voltage of the battery pack 120. If the power tool 100 requests the maximum voltage, then the controller 200 may send a turn-off signal to the power regulation unit 270. For example, the controller 200 may send a signal to a controller of the battery pack 120 to bypass the power regulation unit 270. The power regulation unit 270 can similarly be bypassed when located within a power tool or an adapter. In step 1125, the power regulation unit 270 provides the requested output power profile to the power tool 100, and the controller 200 of the power tool 100 receives the requested output power profile. In some embodiments, based on the output power profile, the power tool 100 is configured to negotiate values for voltage, current, impedance, overload behavior, etc., from the battery pack 120 that are different than standard or rated values for the battery pack 120 (e.g., higher voltage, different shutoff conditions, etc.). In step 1130, the power tool 100 begins its operation based on the negotiated values of the output power profile. Optionally, the power tool 100 may renegotiate the requested power profile during operation. Similar negotiations can occur between the battery pack 120 and a battery pack charger when the battery pack charger is trying to charge the battery pack.

Figure 12:
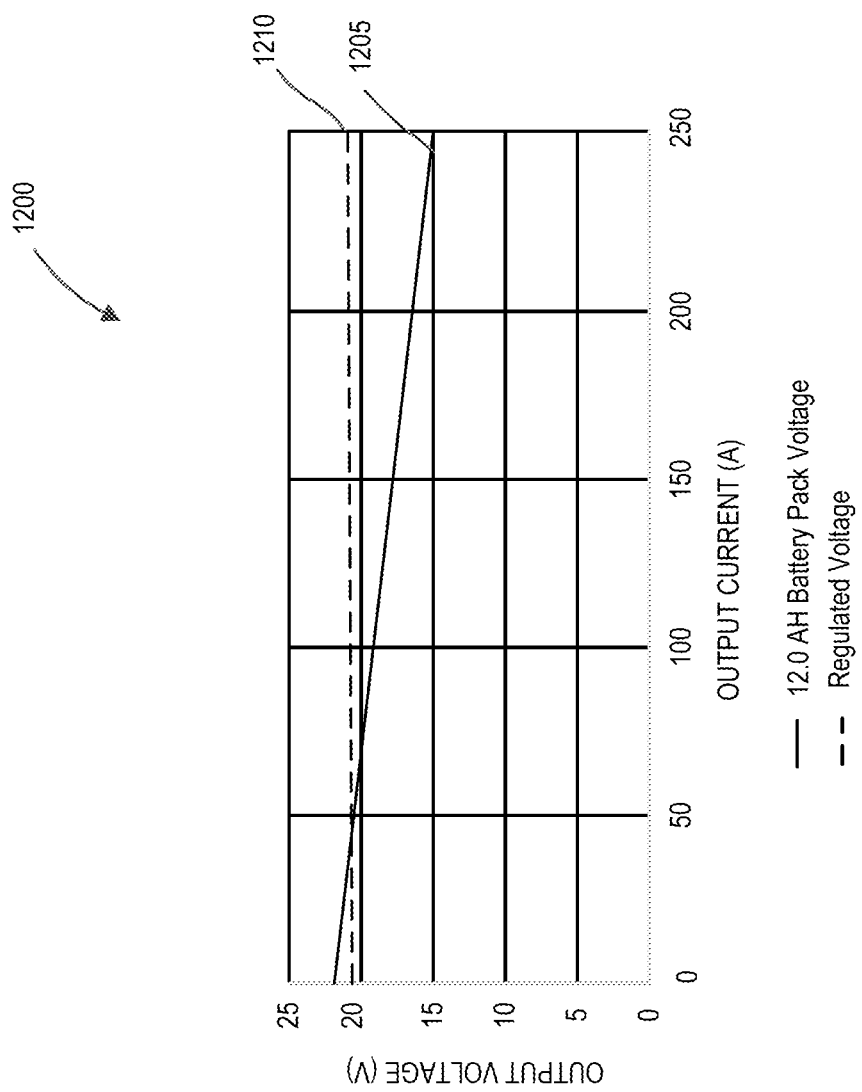
FIG. 12 is a graph of an example operation of the power regulation unit in accordance with embodiments described herein.

FIG. 12 illustrates operating data 1200 for a power tool 100 experiencing a fixed voltage output from a power regulation unit 270 according to the method 800 of FIG. 8. As illustrated by the first line 1205, typical battery packs output a gradually decreasing voltage as the current of a power tool increases. However, as illustrated by the second line 1210, the power regulation unit 270 instead outputs a fixed voltage of 20.5V regardless of the increasing power tool current.

Figure 13:
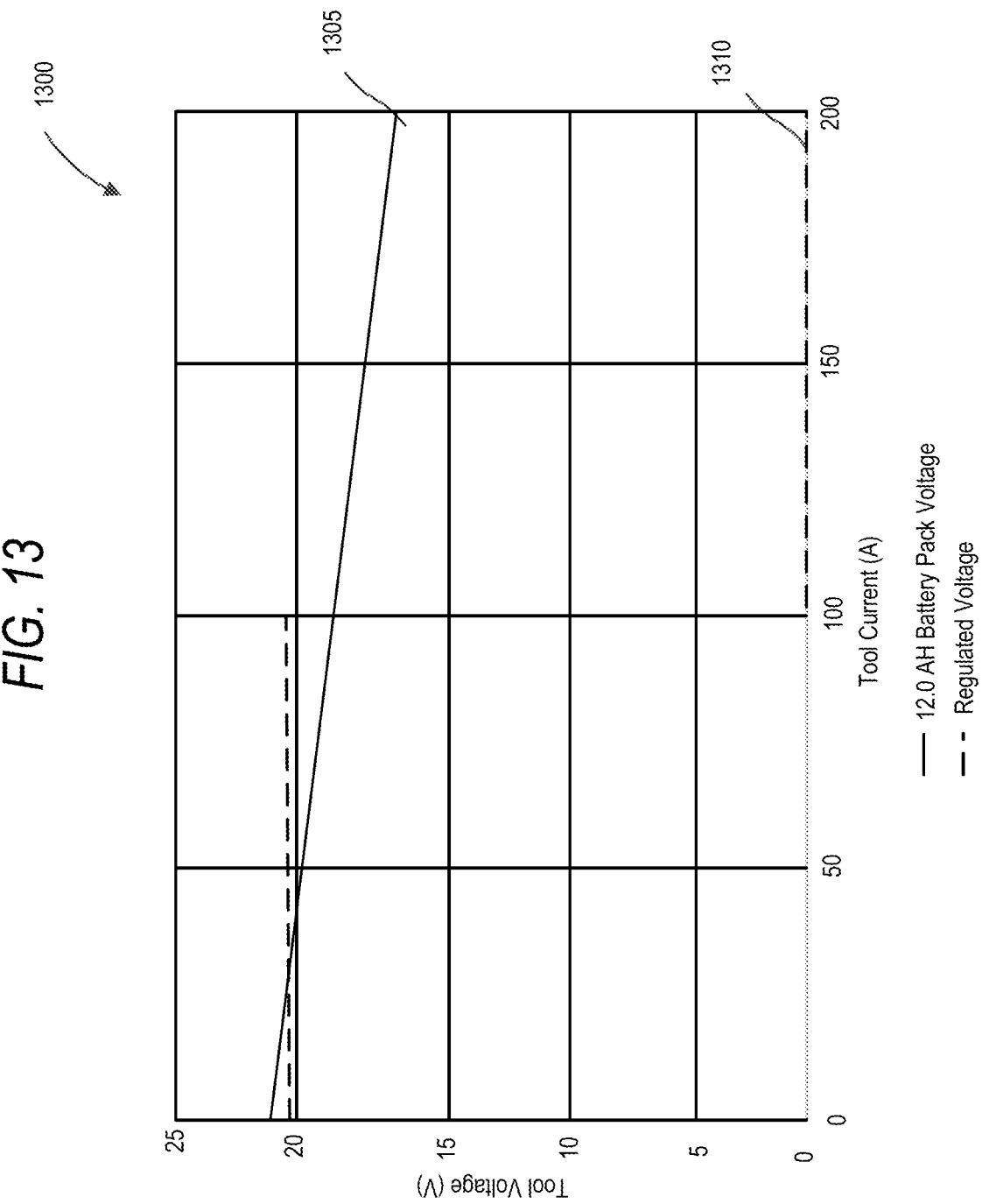
FIG. 13 is a graph of an example operation of the power regulation unit in accordance with embodiments described herein.

FIG. 13 illustrates operating data 1300 for a power tool 100 experiencing a current-limited output from a power regulation unit 270 according to the method 900 of FIG. 9. As illustrated by the first line 1305, typical battery packs output a decreasing voltage as the current of a power tool increases. Alternatively, as illustrated by the second line 1310, the power regulation unit 270 outputs a fixed voltage of 20.5V until a current limit is reached. Once the current limit is reached, the power regulation unit 270 prevents the current to the power tool 100 from exceeding the current limit.

Figure 14A:
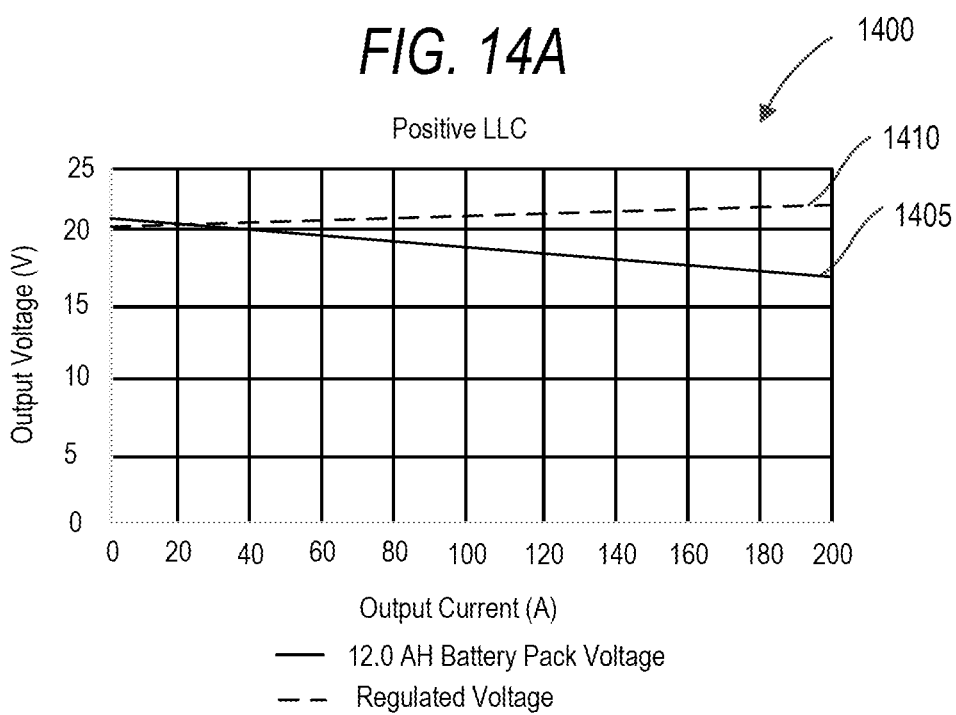
FIGS. 14A and 14B are graphs of example operations of the power regulation unit in accordance with embodiments described herein.
Figure 14B:
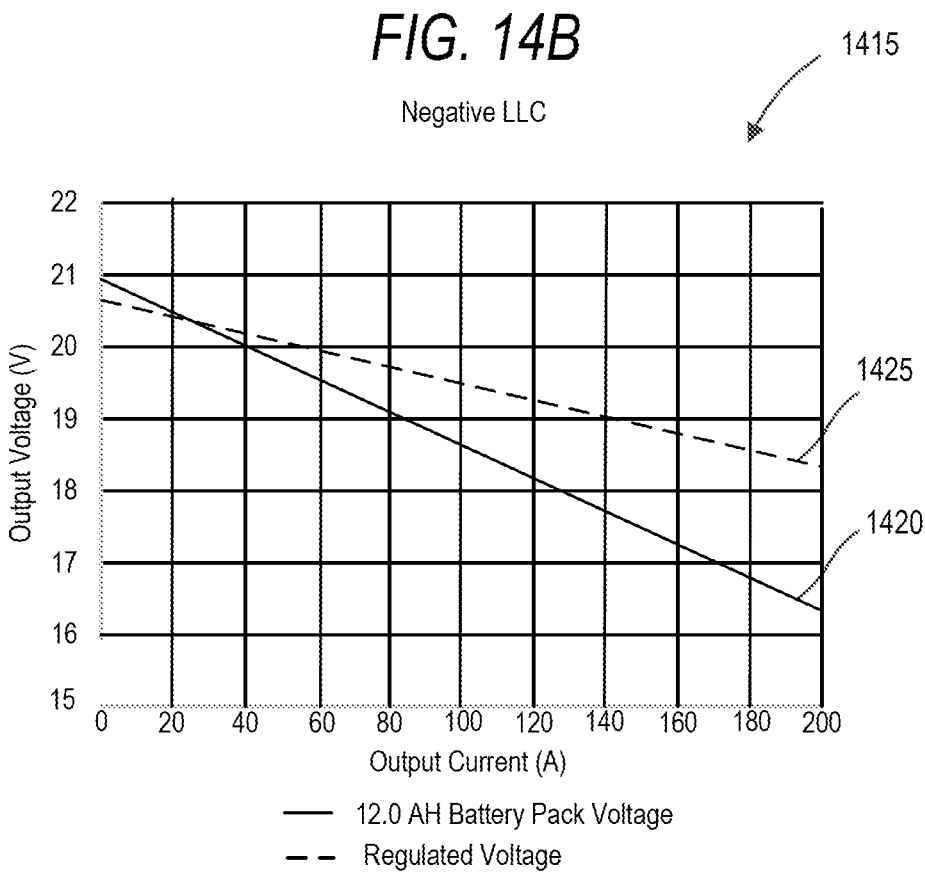

FIGS. 14A and 14B illustrate operating data 1400 for a power tool experiencing automatic load line calibration (LLC) according to embodiments described herein. Using the output current from the battery pack 120, the power regulation unit 270 may change the output voltage to enhance the driving of the power tool 100. As illustrated in FIG. 14A, a positive LLC results in an increasing voltage with the increasing current to maintain an operating voltage. In particular, as illustrated by the first line 1405, typical battery packs output a decreasing voltage as the current of a power tool increases. Alternatively, as illustrated by the second line 1410, the power regulation unit 270 outputs an increasing voltage as the current of the power tool 100 increases. The increase in voltage as the current increases helps to improve the performance of the power tool 100.

As illustrated in FIG. 14B with operating data 1415, a negative LLC results in a decreasing voltage with the increasing current to emulate a traditional battery. In particular, as illustrated by the first line 1420, typical battery packs output a decreasing voltage as the current of a power tool increases at a first negative slope. Alternatively, as illustrated by the second line labeled 1425, the power regulation unit 270 outputs a decreasing voltage as the current of the power tool 100 increases at a second, less steep negative slope. The slower decrease in voltage as the current increases helps to improve power tool compatibility with various battery packs.

Figure 15A:
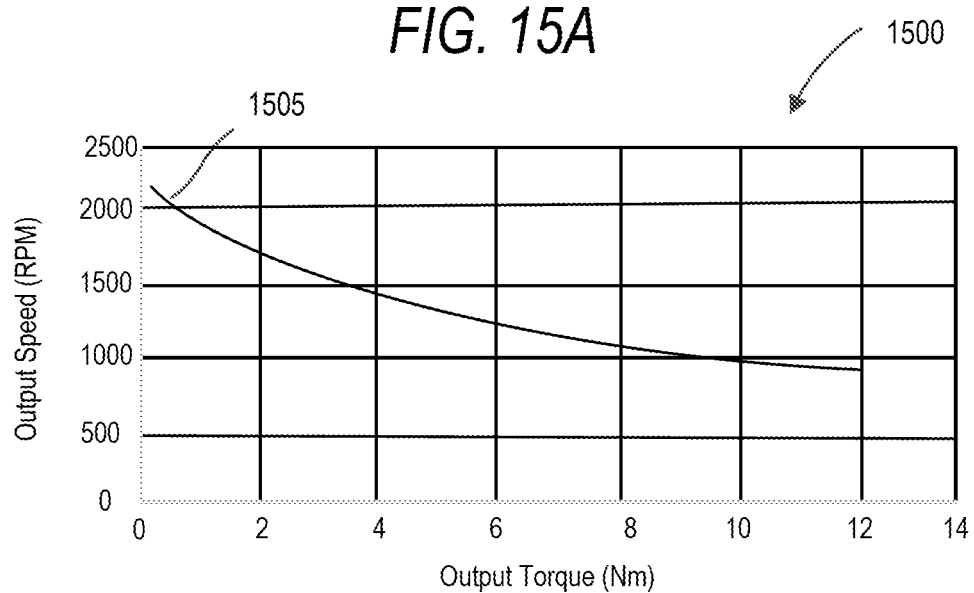
FIGS. 15A and 15B are graphs of example operations of the power regulation unit in accordance with embodiments described herein.
Figure 15B:
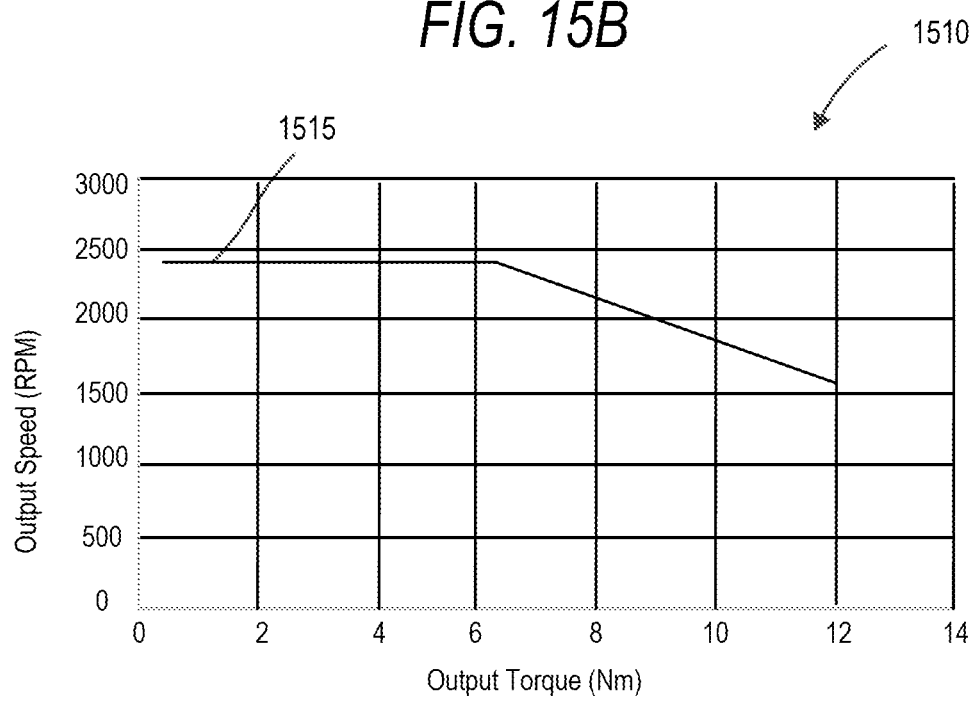

FIGS. 15A and 15B illustrate load line calibration outputs as negotiated by the power regulation unit 270. For example, the power regulation unit 270 may be within the battery pack 120, and the power tool 100 may recognize the presence of the power regulation unit 270 within the battery pack 120 when the battery pack 120 is coupled to the power tool 100. However, in some embodiments, the power regulation unit 270 may be within the power tool 100 or the adapter 150 between the battery pack 120 and the power tool 100. In some embodiments, the power tool 100 requests a particular source voltage and a virtual impedance from the power regulation unit 270 to create a desired motor performance curve.

A first example of a negotiated load line calibration output 1500 is illustrated in FIG. 15A. In the first example, a power tool 100 requests a no-load voltage of 20.5V and an impedance of 55 mOhms from an 18V battery pack. As a result of the request, the load line calibration output is a decreasing curve 1505 for the output speed of the motor 275 versus the output torque of the power tool 100.

A second example of a negotiated load line calibration output 1510 is illustrated in FIG. 15B. In the second example, a power tool 100 requests a no-load voltage of 22V and an impedance of −104 mOhms to provide a constant output speed 1515 from the motor 275. As a result of the request, the motor 275 experiences no slowdowns of the motor as the load increases. In some embodiments, the power tool 100 may additionally implement phase advance/field weakening techniques to further increase the load without slowdowns.

In addition to fixing the voltage output of the power tool 100, limiting the current output to the power tool 100, forcing shutoff when the battery is overloaded, negotiating the desired voltage from the battery pack 120, automatically calibrating the load line to the power tool 100, and negotiating the load line calibration to the power tool 100, the power regulation unit 270 may also be able to support non-standard cell chemistry and non-standard cell configuration.

In some embodiments, the power regulation unit 270 may allow for a power tool (e.g., power tool 100) to be powered by a battery pack (e.g., battery pack 120) that has an alternate chemistry to the battery pack typically used by and designed for the power tool. For example, the power regulation unit 270 determines that the battery cells are a non-compatible chemistry and alters the voltage provided by the battery pack 120 (e.g., 12V) to a voltage suitable for the power tool 100 to operate on (e.g., 18V). In some embodiments, a battery pack including the power regulation unit 270 is able to be charged by a battery pack charger that is typically used by and designed for battery pack of a different voltage. For example, an 18V battery pack is able to be charged on a battery pack charger that normally charges battery packs with battery cells that have a 2.5V full charge chemistry (e.g., nickel cadmium battery packs, nickel-metal hydride battery packs, etc.). Alternatively, a power tool 100 that is normally powered by a battery pack including battery cells having a 2.5V full charge chemistry and be powered by, for example, an 18V battery pack (e.g., the power regulation unit 270 reduces or bucks the output voltage of the battery pack).

In some embodiments, the power regulation unit 270 may allow for a power tool (e.g., power tool 100) to be powered by a battery pack (e.g., battery pack 120) that has an alternate battery cell configuration. The power regulation unit 270 may be within the power tool 100, the battery pack 120, or the adapter 150. The power regulation unit 270 enables alternate cell configurations to be compatible with the power tool 100. For example, an 18V battery pack may be used with a 12V power tool when the power regulation unit 270 is present between the battery pack and the power tool. As another example, a 36V battery pack may be used with an 18V power tool when the power regulation unit 270 is present between the battery pack and the power tool.

Thus, embodiments described herein provide, among other things, power regulation of a power tool battery pack. In some embodiments, a power tool may include a power regulation unit. In some embodiments, the power regulation unit may be within a battery pack, an adapter, or a battery pack charger. Various features and advantages are set forth in the following claims.

What is claimed is:

1. A power regulation unit for regulating power to or from a power tool battery pack, the power regulation unit comprising:
   power regulation circuitry configured to regulate a received power; and
   a controller connected to the power regulation circuitry, the controller configured to:
      receive an input power from one or more battery cells,
      regulate the input power by performing at least one of a voltage regulation and a current regulation, and
      output a regulated output power,
      wherein, for the voltage regulation, the regulated output power includes a constant voltage regardless of an operating current, and
      wherein, for the current regulation, the regulated output power includes the constant voltage and a variable operating current, the variable operating current being permitted to increase up to a predetermined current threshold.

2. The power regulation unit of claim 1, wherein the controller is further configured to:
   determine that the one or more battery cells within the power tool battery pack are in an overloaded condition;
   determine that power tool has continued to operate past the point of the overloaded condition; and
   cease the output of the regulated output power.

3. The power regulation unit of claim 1, wherein the controller is further configured to:
   receive, in response to receiving the input power from the one or more battery cells, a request from a power tool for at least one of a negotiated voltage and a negotiated current; and
   provide the at least one of the negotiated voltage and the negotiated current to the power tool.

4. The power regulation unit of claim 3, wherein the controller is further configured to provide the power tool with a negotiated impedance.

5. The power regulation unit of claim 1, wherein the controller is further configured to:
   determine that a battery cell chemistry is not supported by a power tool; and
   enable the power tool to be powered by the unsupported battery cell chemistry.

6. The power regulation unit of claim 1, wherein the controller is further configured to:
   determine that a configuration of the battery cells is not supported by a power tool; and
   enable the power tool to be powered by the unsupported battery cell configuration.

7. The power regulation unit of claim 1, wherein the power regulation circuitry is configured to operate in a buck mode during discharging of the one or more battery cells.

8. The power regulation unit of claim 1, wherein the controller is further configured to:
   monitor an output current of the battery pack during a power tool operation; and
   alter the constant voltage based on the output current,
   wherein, to alter the constant voltage, the controller is configured to one of increase the constant voltage to a power tool as the output current increases or decrease the constant voltage to the power tool as the output current increases.

9. The power regulation unit of claim 1, wherein the power regulation unit is integrated into one of the power tool battery pack including the one or more battery cells or a power tool.

10. The power regulation unit of claim 1, wherein the power regulation unit is integrated into an adapter that is configured to be positioned between the battery pack including the one or more battery cells and a power tool.

11. A method of operating a power regulation unit to regulate power to or from a power tool battery pack, the method comprising:
   receiving an input power from one or more battery cells;
   regulating the input power by performing at least one of a voltage regulation and a current regulation; and
   outputting a regulated output power,
   wherein, for the voltage regulation, the regulated output power includes a constant voltage regardless of an operating current, and
   wherein, for the current regulation, the regulated output power includes the constant voltage and a variable operating current, the variable operating current being permitted to increase up to a predetermined current threshold.

12. The method of claim 11, further comprising:
   determining that the one or more battery cells within the power tool battery pack are in an overloaded condition;
   determining that a power tool has continued to operate past the point of the overloaded condition; and
   ceasing the output of regulated output power to the power tool.

13. The method of claim 11, further comprising:
   receiving, in response to receiving the input power from the one or more battery cells, a request from a power tool for at least one of a negotiated voltage and a negotiated current; and
   providing the at least one of the negotiated voltage and the negotiated current to the power tool.

14. The method of claim 13, wherein providing the at least one of the negotiated voltage and the negotiated current to the power tool includes providing a negotiated impedance.

15. The method of claim 11 further comprising:
determining that a battery cell chemistry is not supported by a power tool; and
enable the power tool to be powered by the unsupported battery cell chemistry.

16. The method of claim 11 further comprising:
determining that a configuration of the battery cells is not supported by a power tool; and
enabling the power tool to be powered by the unsupported battery cell configuration.

17. The method of claim 11 further comprising:
monitoring an output current of the battery pack during a power tool operation; and
altering the constant voltage based on the output current,
wherein altering the constant voltage includes at least one of increasing the constant voltage to a power tool as the output current increases and decreasing the constant voltage to the power tool as the output current increases.

18. A battery pack system comprising:
a battery pack including:
one or more battery cells,
an interface for mechanically and electrically connecting to a device; and
a power regulation unit including:
power regulation circuitry configured to regulate a received power, and
a controller connected to the power regulation circuitry, the controller is configured to:
regulate the received power by performing at least one of a voltage regulation and a current regulation; and
output a regulated output power,
wherein, for the voltage regulation, the regulated output power includes a constant voltage, and
wherein, for the current regulation, the regulated output power includes the constant voltage until a current reaches a predetermined current threshold.

19. The battery pack system of claim 18, wherein the power regulation unit is located in one of a power tool, a battery pack charger, and an adapter connected between the battery pack and one of the power tool and the battery pack charger.

20. The battery pack system of claim 18, wherein the power regulation unit is bidirectional.

* * * * *